United States Patent
Watanabe et al.

(10) Patent No.: US 9,825,424 B2
(45) Date of Patent: Nov. 21, 2017

(54) OPTICAL DEVICE

(71) Applicant: Mitsubishi Electric Corporation, Tokyo (JP)

(72) Inventors: Yojiro Watanabe, Tokyo (JP); Takeshi Sakimura, Tokyo (JP); Takayuki Yanagisawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/306,565

(22) PCT Filed: Jan. 9, 2015

(86) PCT No.: PCT/JP2015/000079
§ 371 (c)(1),
(2) Date: Oct. 25, 2016

(87) PCT Pub. No.: WO2015/182017
PCT Pub. Date: Dec. 3, 2015

(65) Prior Publication Data
US 2017/0047706 A1   Feb. 16, 2017

(30) Foreign Application Priority Data
May 26, 2014  (JP) .................. 2014-107657

(51) Int. Cl.
*H01S 3/067* (2006.01)
*H01S 3/13* (2006.01)
(Continued)

(52) U.S. Cl.
CPC .......... *H01S 3/1317* (2013.01); *G02B 6/4266* (2013.01); *G02B 6/4293* (2013.01);
(Continued)

(58) Field of Classification Search
CPC ............... H01S 3/1317; H01S 3/06754; H01S 3/07662; G02B 2006/12038;
(Continued)

(56) References Cited

U.S. PATENT DOCUMENTS

| | | | | |
|---|---|---|---|---|
| 6,208,456 B1 * | 3/2001 | Lawrence | ............... | H01S 3/063 359/333 |
| 6,288,833 B1 * | 9/2001 | Kasamatsu | ............. | H01S 3/063 359/333 |

(Continued)

FOREIGN PATENT DOCUMENTS

| | | |
|---|---|---|
| JP | S59-033430 A | 2/1984 |
| JP | 2002-182171 A | 6/2002 |
| WO | 2010/073704 A1 | 7/2010 |

OTHER PUBLICATIONS

Written Opinion issued in PCT/JP2015/000079; dated Mar. 31, 2015.
(Continued)

*Primary Examiner* — Eric Bolda
(74) *Attorney, Agent, or Firm* — Studebaker & Brackett PC

(57) ABSTRACT

An object is to provide an optical device capable of relaxing a manufacturing condition for an optical waveguide used in the optical device. An optical device 500 is provided with an optical waveguide 200 including a core and a cladding optically joined together, and a temperature controller 600 that controls temperature of the optical waveguide, wherein the optical waveguide includes the core and the cladding formed such that a normalized frequency specified for light propagating through the optical waveguide changes across a cutoff frequency of a guided mode determined from a structure of the optical waveguide in a temperature range in which a refractive index of the core is higher than a refractive index of the clad. The temperature controller (Continued)

controls the temperature of the optical waveguide over a temperature range across temperature at which the normalized frequency equals to the cutoff frequency.

20 Claims, 14 Drawing Sheets

(51) Int. Cl.
| | |
|---|---|
| *G02B 6/12* | (2006.01) |
| *G02B 6/42* | (2006.01) |
| *H01S 3/131* | (2006.01) |
| *H01S 3/063* | (2006.01) |
| *H01S 3/102* | (2006.01) |
| *H01S 3/17* | (2006.01) |
| *G02B 6/43* | (2006.01) |
| *H01S 3/08* | (2006.01) |
| *H01S 3/16* | (2006.01) |

(52) U.S. Cl.
CPC .............. *G02B 6/43* (2013.01); *H01S 3/0632* (2013.01); *H01S 3/0637* (2013.01); *H01S 3/1028* (2013.01); *H01S 3/17* (2013.01); *H01S 3/08054* (2013.01); *H01S 3/1603* (2013.01); *H01S 3/163* (2013.01)

(58) Field of Classification Search
CPC .. G02B 2006/12066; G02B 2006/1208; G02B 6/102; G02B 6/12; G02B 6/12007
See application file for complete search history.

(56) References Cited

U.S. PATENT DOCUMENTS

| | | | |
|---|---|---|---|
| 7,079,747 B1* | 7/2006 | Gagnon | G02B 6/02204 |
| | | | 385/12 |
| 2004/0052454 A1 | 3/2004 | Kim | |
| 2007/0058914 A1* | 3/2007 | Chi | G02B 6/02052 |
| | | | 385/123 |
| 2011/0255826 A1 | 10/2011 | Tokushima | |
| 2016/0301179 A1 | 10/2016 | Watanabe et al. | |

OTHER PUBLICATIONS

International Search Report issued in PCT/JP2015/000079; dated Mar. 31, 2015.
Katsunari; Fundamentals of Optical Waveguides; Photonics Series, 13; 1992; pp. 14-27; Corona Publishing Co., Ltd.
Vasinek; Temperature influence on the mode distribution in SM fiber nearby the cutoff normalized frequency; Proceedings of SPIE; 2006; pp. 61800T-.1-61800T.6; vol. 6180.
Coscelli E et al., "Enhanced thermal-effect resilience in distributed modal filtering large mode area photonic crystal fibers", 2013 Conference on Lasers & Electro-Optics Europe & International Quantum Electronics Conference Cleo Europe/IQEC, IEEE, May 12, 2013, p. 1, XP032588601, DOI: 101109/CLEOE-IQEC.2013. 6801370, retrieved on Apr. 17, 2014.
The extended European search report issued by the European Patent Office dated Apr. 20, 2017, which corresponds to EP15800480.4 - 1553 and is related to U.S. Appl. No. 15/306,565.

* cited by examiner

OPTICAL DEVICE

TECHNICAL FIELD

The present invention generally relates to an optical device, and particularly to an optical device having an optical waveguide.

BACKGROUND ART

The optical waveguide is intended to mean a transmission path prepared by using a substance having an optical characteristic (hereinafter, referred to as an optical material) which uses light as an object to be transmitted.

The optical waveguide has a structure in which a cladding having a lower refractive index than that of a core is optically joined to an outside of the core extending in a propagation direction of the light, and the core mainly serves as an optical path.

The optical waveguide includes various structures such as a coaxial structure including a so-called optical fiber, and a plate-shaped structure.

The optical waveguide does not only propagate the light, but also, there is the optical waveguide in which an electric element required for transmission and a structure for branching an optical path or binding the optical paths are embedded.

Herein, when the term "structure" is used herein and in the following descriptions, this is used as a concept including a material to be used and a characteristic thereof in addition to a mechanical structure such as dimension of the optical waveguide.

As a simple example of the conventional optical waveguide, the optical waveguide having a sheet-like shape or a plate shape (hereinafter, referred to as a planar waveguide) is known (Non-Patent Literature 1).

CITATION LIST

Non-Patent Literature

Non-Patent Literature 1: Katsunari, Okamoto. (1992) Fundamentals of Optical Waveguides, Photonics Series, 13. Corona Publishing Co., Ltd., pp. 14-27.

SUMMARY OF INVENTION

Technical Problem

When preparing a planar waveguide type optical waveguide, it is required to determine in advance mainly (1) a wavelength of light transmitted through the optical waveguide, (2) a refractive index of an optical material of a core, (3) a refractive index of an optical material of a cladding, and (4) thickness of the core.

Only a specific propagating mode (hereinafter, referred to as a guided mode) when the light propagates while being enclosed in the optical waveguide is allowed depending on a structure of a prepared optical waveguide and an order is used as one of parameters for distinguishing each guided mode.

The guided mode in the planar waveguide type optical waveguide is specified depending on a normalized frequency $v$ defined by following equation.

$$v = \frac{\pi t}{\lambda} \sqrt{n_{core}^2 - n_{clad}^2} \quad (1)$$

Herein, $\pi$, $t$, $\lambda$, $n_{core}$, and $n_{clad}$ represent a circular constant, the thickness of the core, the wavelength of the light, the refractive index of the core, and the refractive index of the cladding, respectively.

When equation (2.14) in Non-Patent Literature 1 described above is transformed by replacing t with 2a based on FIG. 2.2 of Non-Patent Literature 1, an equation similar to equation (1) described above is obtained.

A cutoff frequency being a frequency corresponding to a boundary whether the light in a certain guided mode is allowed is provided by the following equation.

$$v_m = \frac{m\pi}{2} \quad (2)$$

Herein, m represents the order of the guided mode.

For example, when $v$ is larger than $v_m$, the light in zeroth to m-th order guided modes may propagate through the optical waveguide.

In contrast, in an application field of the optical waveguide generally, the light propagating through the optical waveguide is often desirably in a lower-order guided mode.

However, as is clear from equation (1) described above, when preparing the optical waveguide by a manufacturing condition to limit to a lower order, it is required to make the thickness t of the core 1 thinner.

Therefore, there is a problem that the manufacturing condition such as securement of dimension accuracy becomes severer when preparing the optical waveguide having the core of thinner thickness t.

Therefore, working accuracy of the optical waveguide is deteriorated, or mass-productivity (yield) decreases, and a problem that performance of the optical device using the optical waveguide and (or) mass-productivity thereof are deteriorated is eventually assumed.

Also in the optical waveguide having another structure such as the optical fiber, the normalized frequency, the mode, and the cutoff frequency may be obtained similarly. For example, in the optical fiber, the normalized frequency may be specified by using a diameter of the core as the parameter in place of the thickness t of the core in equation (1) described above; when preparing with the manufacturing condition corresponding to a lower order, the diameter of the core should be made smaller.

The present invention is made in order to solve the above-mentioned problems, and it is therefore an object of the present invention to provide an optical device capable of relaxing the manufacturing condition for the optical waveguide used in the optical device.

Solution to Problem

An optical device according to the present invention is an optical device that has an optical waveguide including a core and a cladding optically joined together, and a temperature controller to control temperature of the optical waveguide.

The optical waveguide includes the core and the cladding formed in which a normalized frequency specified for light propagating through the optical waveguide changes across a cutoff frequency of a guided mode determined from a structure of the optical waveguide in a first temperature range in which a refractive index of the core is higher than a refractive index of the cladding.

The temperature controller is configured to control the temperature of the optical waveguide over a second temperature range across a temperature at which the normalized frequency equals to the cutoff frequency.

Advantageous Effects of Invention

According to the optical device of the present invention, it is possible to provide the optical device capable of relaxing the manufacturing condition for the optical waveguide used in the optical device.

DESCRIPTION OF EMBODIMENTS

Figure 1:
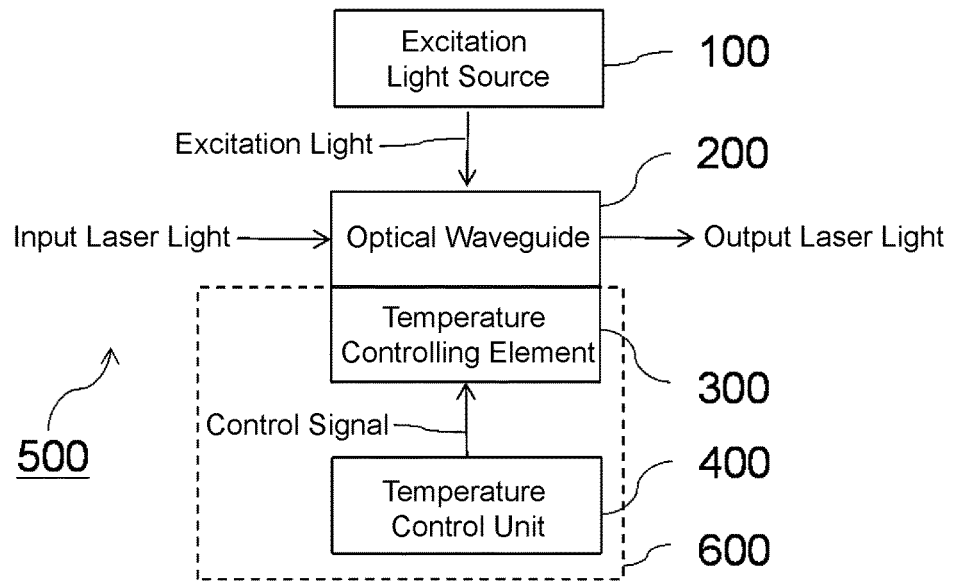
FIG. 1 is a schematic diagram illustrating an internal configuration of an optical device in a first embodiment of the present invention.

In the following, embodiments of the present invention will be described with reference to the drawings.

In the drawings illustrating the following embodiments, the same or similar components are assigned with the same or similar numbers and the description thereof might be partially omitted in the description of the embodiments.

In order to make the present invention comprehensible, for the drawings illustrating the following embodiments, an exemplary case will be described in which (1) an optical waveguide is an optical waveguide of a planar-waveguide type having a symmetrical structure in a cross-section, (2) a core has an amplifying function for light propagating through the optical waveguide, and (3) an optical device is a laser device in which laser light propagates through the optical waveguide.

The core having the amplifying function for the laser light will be referred to as a laser medium in some cases.

First Embodiment

A first embodiment of the present invention is hereinafter described with reference to FIGS. 1 to 5.

FIG. 1 is a schematic diagram illustrating an internal configuration of an optical device in the first embodiment of the present invention.

In the drawing, reference numerals 100, 200, 300, 400, 500 and 600 represent an excitation light source, an optical waveguide, a temperature controlling element, a temperature control unit, an optical device and a temperature controller, respectively. Arrows indicate light, a signal, and/or information, and their propagation directions.

In mounting of the optical devices 500, various types of optical devices 500 in a broad sense including components not illustrated may also be defined; (1) a laser light source, (2) a resonator, (3) a passive optical element, as exemplified by a mirror, a lens, and a prism, (4) a power supply, (5) communicating means, and (6) various interfaces may also be included, for example.

The temperature controlling element 300 and the temperature control unit 400 form the temperature controller 600.

Figure 2:
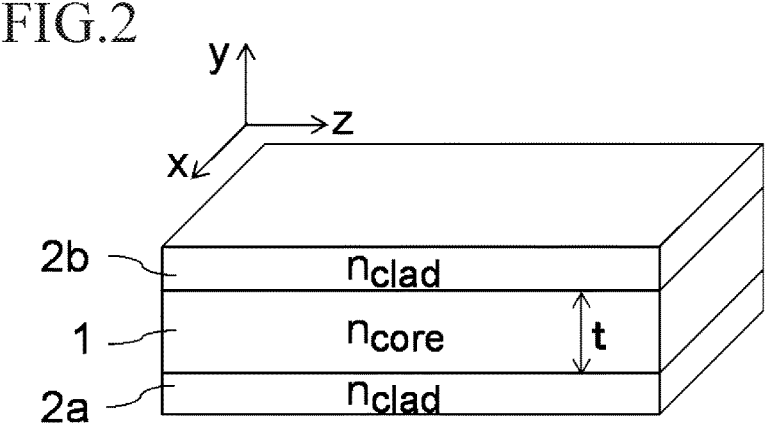
FIG. 2 is a perspective view illustrating an optical waveguide in the first embodiment of the invention.

FIG. 2 is a perspective view illustrating the optical waveguide 200 in the first embodiment of the invention.

In the drawing, a reference numeral 1 represents a core, reference numerals 2a and 2b represent claddings, $n_{core}$, $n_{clad}$, and t represent a refractive index of the core, a refractive index of the cladding, and thickness of the core, respectively, and x, y, and z represent convenient coordinate axes.

In this embodiment, the optical waveguide 200 extends in a z-axis direction and an optical axis of propagating light extends in the z-axis direction.

The excitation light source 100 generates excitation light for allowing the core 1 to generate an amplifying light on light.

The excitation light source 100 is selected according to laser light and a type and a characteristic of an optical material of the core 1.

This embodiment is an example of a case in which the excitation light enters from a side of the optical waveguide 200 as illustrated in FIG. 1.

The optical waveguide 200 includes the core 1 in a plate shape and the claddings 2a and 2b in a plate shape optically joined to the core 1 on two principal surfaces of the core 1.

The optical waveguide 200 is excited by the excitation light from the excitation light source 100 to generate the amplifying function on the laser light propagating through the optical waveguide 200, a so-called amplification gain.

Specifically, a population inversion state is formed in the core 1 (laser medium) which absorbs the excitation light and the amplifying function for the laser light propagating through the optical waveguide 200 is generated.

The width in an x-direction of the core 1 is desirably wider than a wavelength of the light propagating through the optical waveguide 200 such that the light propagating through the optical waveguide 200 concentrates in the core 1.

Similarly, thickness in a y-direction of the claddings 2a and 2b is desirably thicker than the wavelength of the light propagating through the optical waveguide 200.

Temperature characteristics of the refractive index $n_{core}$ of the core 1 and the refractive index $n_{clad}$ of the claddings 2a and 2b have a temperature range in which the refractive index $n_{core}$ of the core 1 is higher than the refractive index $n_{clad}$ of the claddings 2a and 2b.

In this embodiment, a case in which temperature dependence of the refractive index $n_{core}$ of the core 1 is negative ($\therefore (n_{core})/dT<0$, wherein T represents temperature) and temperature dependence of the refractive index $n_{clad}$ of the claddings 2a and 2b is positive ($\therefore (n_{clad})/dT>0$) is described as an example (refer to FIG. 4 to be described later).

Conventional and novel various methods may be applied to a method of optically joining the core 1 and the claddings 2a and 2b together; for example, (1) a method of preparing the core 1 first and depositing an optical material of the claddings 2a and 2b on the core 1 as a material and (2) a method of preparing the core 1 and the claddings 2a and 2b and joining them together by optical contact, diffusion joining, or surface activated joining may be applied.

Conventional and novel various optical materials may be applied to the optical material (laser medium) which provides the amplifying function for the light in the core 1; for example, (1) Er:Yb:Glass, (2) Nd:Glass, (3) Er:Glass, (4) Yb:Glass, and (5) Pr:Glass may be applied as glass materials, and (6) Nd:YLF, (7) Yb:YLF, (8) Er:YLF, (9) Pr:YLF, (10) Ho:YLF, (11) Tm:YLF, (12) Tm:Ho:YLF, (13) Yb:KYW, (14) Yb:KGW, and (15) Cr:LiSAF may be applied as crystal materials. For example, a ceramic material doped with an activated ion may also be used. In this regard, the above-described "Glass" is desirably phosphate glass, quartz glass, or fluoride glass. Er, Yb, Nd, Pr, Ho, Tm, and Cr are sometimes referred to as activated ions.

Various optical materials may be applied to the optical material of the claddings 2a and 2b; for example, (1) a glass material, (2) calcite, and (3) KTP may be applied.

The glass material is such that a value of the refractive index and the temperature dependence thereof may be adjusted at a manufacturing step thereof, and it is possible to (1) make the temperature dependence of the refractive index positive and (2) make the temperature dependence thereof substantially zero, for example.

A combination achieving the effect of the present invention is selected as the combination of the optical materials of the core 1 and the claddings 2a and 2b.

That is to say, as the optical waveguide 200 used in the optical device 500, the optical waveguide 200 prepared by the combination of the optical materials of the core 1 and the claddings 2a and 2b such that a normalized frequency v changes across a cutoff frequency $v_m$ in the temperature range in which the refractive index of the core 1 is higher than the refractive index of the claddings 2a and 2b is used (refer to FIG. 5 to be described later).

The temperature controlling element 300 arranged on an outer side of at least one of the claddings 2a and 2b heats or cools according to a characteristic of the element to be used.

It is selected whether to use the element for heating or the element for cooling in temperature control according to a structure of the optical waveguide 200.

This embodiment is an example of a case in which the element is arranged on one of the claddings 2a and 2b, so that temperature of the optical waveguide 200 is controlled from one of the claddings 2a and 2b.

Various mounting modes are available as the mounting of the temperature controlling element 300; for example, (1) a heat sink, (2) a Peltier element, and (3) a heater may be applied. It is also possible to bring (4) fluid (medium) such as air or liquid into direct or indirect contact in place of the above-described elements.

The temperature control unit 400 generates a control signal for the temperature control for the temperature controlling element 300 and controls the temperature of the optical waveguide 200 through the temperature controlling element 300.

The temperature control unit 400 has a temperature control range in which the normalized frequency v specified for the light propagating through the optical waveguide 200 changes across temperature at which this equals to the cutoff frequency $v_m$ of a specific order of a guided mode determined from the structure of the optical waveguide 200 (refer to following FIG. 5 to be described later).

In mounting of the temperature control unit 400, it is configured to include any one or all of various components required for the temperature control, for example, (1) an arithmetic device (for example, CPU), (2) a memory (for example, a RAM and a ROM), (3) a temperature sensor, (4) an A/D converter, (5) a D/A converter, (6) a controlling interface, and (7) a signal bus according to a mounting mode.

The memory is configured to include any one or a combination of various pieces of information required for the temperature control, for example, (1) a control program, (2) information of the temperature characteristic of the refractive index, (3) information of the temperature at which the normalized frequency v equals to the cutoff frequency $v_m$, (4) information of the temperature at which the normalized frequency v is higher than the cutoff frequency $v_m$, (5) information of the temperature at which the normalized frequency v is lower than the cutoff frequency $v_m$, (6) a plurality of pieces of information (3) to (5) described above, and (7) information of an input/output characteristic of a temperature sensor according to the mounting mode.

It is also possible to perform the temperature control in consideration of a margin for control in which variation of the various components is reflected in the temperature control. In addition to the temperature control in one direction from the temperature control unit 400 to the temperature controlling element 300 as illustrated in FIG. 1, various control modes may be applied according to the mounting of the optical device 500; for example, feedback control is performed by using the temperature sensor (not illustrated).

Operation of the temperature control is described in detail in the description of an operation principle to be described later.

Figure 3:
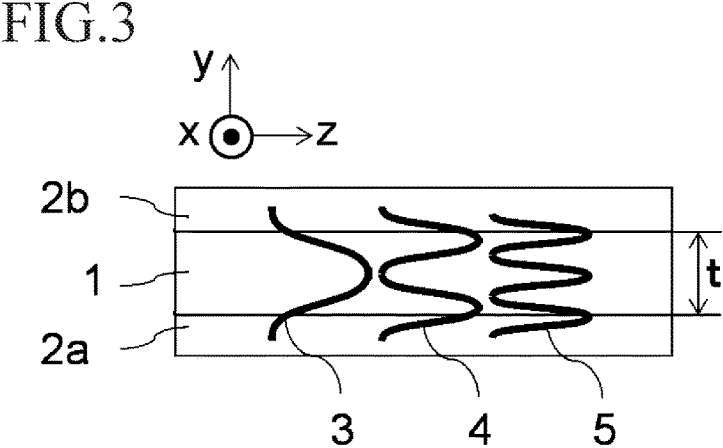
FIG. 3 is a cross-sectional view illustrating the optical waveguide in the first embodiment of the present invention.

FIG. 3 is a cross-sectional view illustrating the optical waveguide in the first embodiment of the present invention.

In the drawing, reference numerals 3 to 5 represent examples of a state of electric field intensity distribution in the y-direction of the light in the guided mode propagating in the z-direction corresponding to values of different orders. Reference numerals 3, 4, and 5 correspond to a zeroth-order guided mode, a first-order guided mode, and a second-order guided mode, respectively.

Display positions in the z-direction are for making illustrated respective modes easily visible and do not have special meaning.

Other components are similar to those in FIG. 2, so that the description thereof is omitted.

Figure 4:
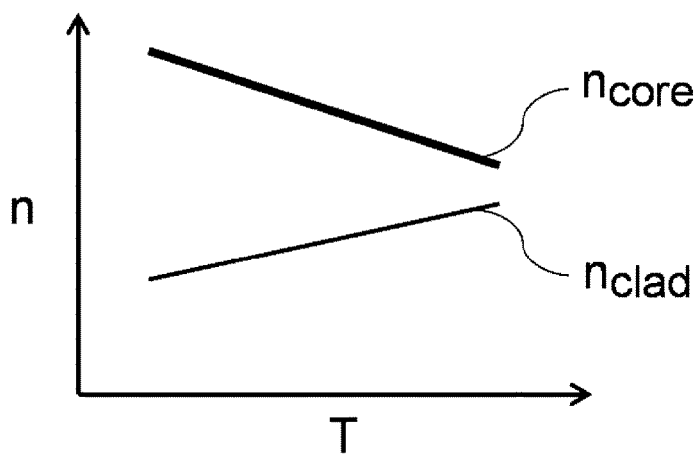
FIG. 4 is a schematic diagram illustrating temperature dependence of refractive indices of a core and a cladding in the first embodiment of the present invention.

FIG. 4 is a schematic diagram illustrating the temperature dependence of the refractive indices of the core and the claddings in the first embodiment of the present invention.

In the drawing, n, T, $n_{core}$, and $n_{clad}$ represent the refractive index, the temperature, the refractive index of the core, and the refractive index of the cladding, respectively.

Herein, the characteristics of $n_{core}$ and $n_{clad}$ illustrated in the drawing are the characteristics at a wavelength λ of the light propagating through the optical waveguide 200 in the optical device 500, in other words, the characteristics of the refractive indices sensed by the laser light in the core 1 and the claddings 2a and 2b when the laser light of the supposed wavelength λ propagates through the optical waveguide 200.

Figure 5:
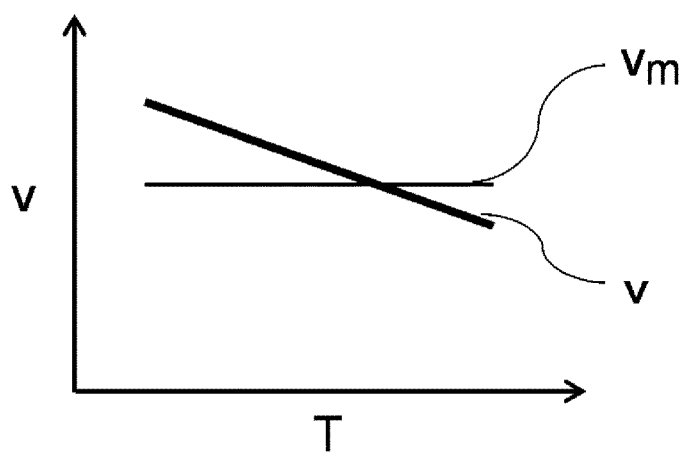
FIG. 5 is a schematic diagram illustrating temperature dependence of a normalized frequency in the first embodiment of the present invention.

FIG. 5 is a schematic diagram illustrating temperature dependence of the normalized frequency in the first embodiment of the present invention.

In the drawing, v and $v_m$ represent the normalized frequency and an m-th order cutoff frequency, respectively.

Next, the operation principle of the optical device 500 is described.

Herein, $v > v_m$ is satisfied at normal temperature and $v < v_m$ is satisfied at the temperature of the optical waveguide 200 when the optical device 500 operates.

The temperature control unit 400 controls the temperature controlling element 300 such that the temperature of the optical waveguide 200 is heated to the temperature at which $v < v_m$ is satisfied in the temperature range in which the refractive index $n_{core}$ of the core 1 is higher than the refractive index $n_{clad}$ of the claddings 2a and 2b when the optical device 500 operates.

As illustrated in FIG. 4, the temperature characteristic of the refractive index of the core 1 is negative and the temperature characteristic of the refractive index of the claddings 2a and 2b is positive, so that difference between the refractive index of the core 1 and that of the claddings 2a and 2b decreases by heating.

From equation (1) above, it is understood that the normalized frequency v for the light of the wavelength depends on the difference between the square of the refractive index of the core and the square of the refractive index of the clad.

Therefore, since the normalized frequency v changes as in FIG. 5 corresponding to an increase in temperature of the optical waveguide 200 and the optical waveguide 200 cannot propagate the light in an m-th order guided mode, so that this equivalently serves as the optical waveguide up to an (m−1)-th order.

As described above, it is understood that the guided mode of the light propagating through the optical waveguide 200 may be limited to an (m−1)th or lower-order guided mode by selecting the thickness t of the core 1 capable of propagating up to the m-th order guided mode as a manufacturing condition for the optical waveguide 200 and heating to temperature not lower than the temperature at which the normalized frequency v equals to the m-th order cutoff frequency $v_m$ when the optical device 500 is used.

A specific value of the order m is selected according to characteristic of the light required in the mounting of the optical device 500 or performance as the optical device 500.

The temperature range in which the refractive index $n_{core}$ of the core 1 is higher than the refractive index $n_{clad}$ of the claddings 2a and 2b and the temperature range in the temperature control which may be the same or different are selected according to the mounting of the optical device 500. The temperature range in the temperature control may be such that the range which may be set and the range when the optical device 500 is actually used are the same or different.

For example, the optical device 500 which requires only the light in the zeroth-order guided mode is provided with the optical waveguide 200 which allows up to the first-order guided mode.

As described above, according to the optical device of this embodiment, the optical device 500 capable of relaxing the manufacturing condition for the optical waveguide 200 used in the optical device 500 may be provided.

According to the optical device of this embodiment, the laser device 500 is formed by using a planar waveguide type optical waveguide 200. Since the planar waveguide in which the thickness t of the laser medium being the core 1 is thin may realize high excitation density of electrons of the laser medium in the population inversion state, a large light amplification gain may be obtained as the laser device 500 even when the laser medium having a small cross-section of induced emission is used. According to this, highly efficient amplification operation of the laser light may be realized.

The planar waveguide type optical waveguide 200 may easily scale an output of the laser light while maintaining the excitation density at a predetermined value by changing the width (dimension in the x-direction in FIG. 2) of the optical waveguide 200.

According to the optical device 500 of this embodiment, the temperature dependence of the refractive index of the core 1 is negative and the temperature dependence of the refractive index of the claddings 2a and 2b is positive, and the optical waveguide 200 is configured such that the temperature thereof is controlled from outside of the optical waveguide 200. The temperature controller 600 controls the temperature of the optical waveguide 200 over the temperature range across the temperature at which the normalized frequency v equals to the cutoff frequency $v_m$, so that it becomes possible to make the refractive indices of the core and the claddings variable and variably control the number of guided modes which may propagate.

When the optical device of this embodiment is applied to a radar device using the laser light (LIDAR: light detection and ranging, laser imaging detection and ranging), for example, it is possible to improve performance as the radar device, as exemplified by light condensing performance of the laser light, and mass-productivity of the radar device.

Although the claddings 2a and 2b are prepared of a specific optical material in the embodiment of the present invention, another structure is also possible; for example, the optical waveguide 200 in which one of the claddings 2a and 2b is not prepared, that is to say, a structure in which one of the claddings 2a and 2b is formed of air (including a mesa waveguide) is also possible and the structure is not limited to that of the above-described embodiment.

Although a case in which the core 1 and the claddings 2a and 2b in the plate shape have cross-sectional structures with the same dimension in the y direction (a so-called slab waveguide) is described as an example in the embodiment of the present invention, a cross-sectional structure in which the width of the core 1 is narrow and the cladding 2 encloses the core 1 (a so-called embedded waveguide) is also possible; the structure is not limited to that of the above-described embodiment.

Although the case in which the core 1 is the laser medium is described in the embodiment of the present invention, the optical waveguide 200 may be formed of the optical material without the activated ion included in a case of the optical device in which the amplifying function is not necessary in the optical waveguide 200, for example, the optical device in which this serves as a simple optical transmission path.

For example, when this serves as the optical waveguide even when there is no excitation light in a case of the optical material including Nd as the activated ion, that is to say, when an attenuation amount of the light is small, the excitation light source is not required. On the other hand, in a case of the optical material including Er or Yb as the activated ion, there is a case in which the attenuation amount is large as-is, so that it is desirable to use the excitation light source in order to generate a function to reduce the attenuation of the light by the activated ion and allow the same to serve as the optical waveguide 200.

Although the case in which the planar waveguide type optical waveguide 200 is provided is described as an example in the embodiment of the present invention, it is sufficient that the optical waveguide 200 includes the core 1 and the claddings 2a and 2b optically joined together; it is possible to apply the present invention to the waveguide structure other than the planar waveguide, as exemplified by an optical fiber and the like, and this is not limited to the above-described embodiment.

Although the case in which relationship between the core 1 and the claddings 2a and 2b satisfies $d(n_{core})/dT<d(n_{clad})/dT$ is described in the embodiment of the present invention, it is sufficient that the difference between the squares of the refractive indices decreases with a change in temperature within the temperature range in which the refractive index $n_{core}$ of the core 1 is higher than the refractive index $n_{clad}$ of the clad; for example, a case of the relationship such as (1) $d(n_{core})/dT>d(n_{clad})/dT$ and (2) $d(n_{core})/dT=d(n_{clad})/dT$ is also possible and this is not limited to the above-described embodiment.

Although the case in which the temperature dependence of the refractive index of the core 1 is negative is described as an example in the embodiment of the present invention, it is also possible to use the optical material whose temperature dependence is positive; for example, (1) Er:Yb:Glass, (2)Nd:Glass, (3)Er:Glass, (4)Yb:Glass, (5)Pr:Glass, (6)Yb:YAG, (7)Nd:YAG, (8)Er:YAG, (9)Er:Yb:YAG, (10) Cr:Tm:Ho:YAG, (11)Tm:Ho:YAG, (12)Tm:YAG, (13)Ho:YAG, and (14)Pr:YAG may be applied. In this case also, the core 1 and the claddings 2a and 2b are formed such that the normalized frequency v of the optical waveguide 200 changes across the cutoff frequency of the guided mode in a first temperature range.

Although the example of the case in which the excitation light enters from the side of the optical waveguide 200, as in FIG. 1 in the embodiment of the present invention, it is sufficient that this enters the optical waveguide 200 so as to generate the amplifying function for the light in the optical waveguide 200, so that this is not limited to the configuration and arrangement relationship in the drawing.

Although the example of the case in which the frequency steps across one specific cutoff frequency is described in the embodiment of the present invention, it is also possible to use the optical waveguide 200 configured to step across values of a plurality of orders to control the temperature at the time of operation according to the mounting of the optical device 500; this is not limited to the above-described embodiment.

Although the example of the case in which the laser light propagates through the optical waveguide 200 is described in the embodiment of the present invention, light other than the laser light may also be used; this is not limited to the above-described embodiment.

Although the embodiment of the present invention is the example of the case in which the laser light in the zeroth-order guided mode entering from the laser light source (not illustrated) is propagated/amplified to be emitted when the optical device 500 operates, it is also possible to configure the optical device used as propagation controlling means to control whether to propagate to emit the m-th order guided mode when the mth or lower-order guided mode is included in the laser light entering from the laser light source to the optical waveguide 200.

Second Embodiment

Hereinafter, a second embodiment of the present invention will be described with reference to FIGS. 6 to 8.

In the following embodiments, combinations of specific optical materials for carrying out the invention will be described for describing the present invention in further detail. In this regard, the combinations of the optical materials are examples, no limitation thereto intended. There is a case in which a combination of temperature characteristics (positive or negative) of refractive indices is different from that of the above-described first embodiment.

Various temperature characteristics described in the following embodiments are results of calculation based on characteristic values described in catalogs of the optical materials to be used and documents.

The various temperature characteristics described in the following embodiments are obtained supposing a case in which temperature of the optical material or an optical waveguide 200 is entirely uniformly controlled.

The component and operation the same as or similar to those of the above-described first embodiment are sometimes not described.

Figure 6:
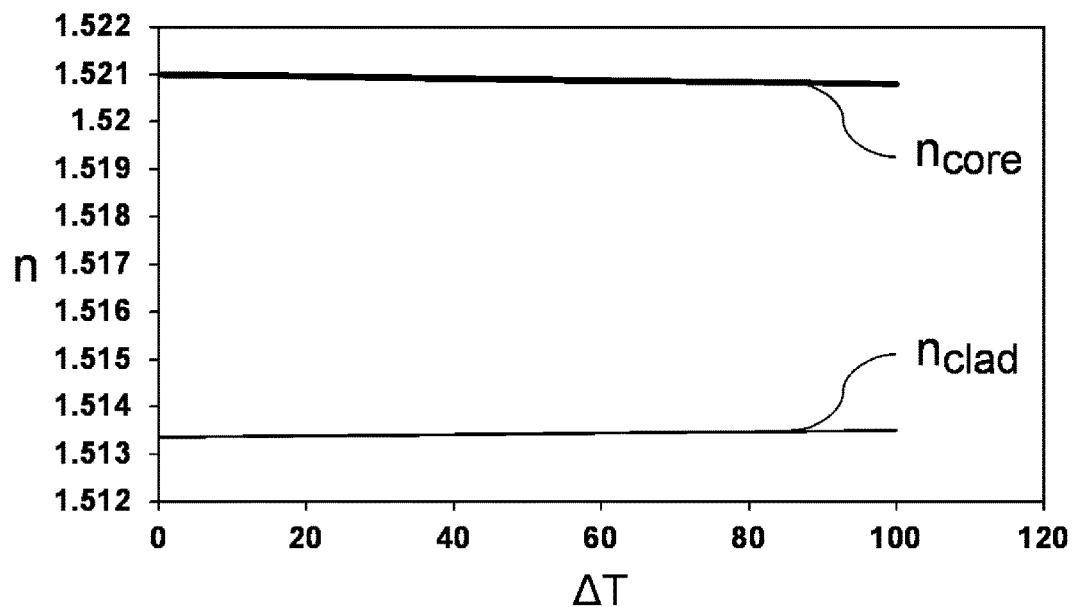
FIG. 6 is a view illustrating temperature dependence of refractive indices of a core and a cladding in a second embodiment of the present invention.

FIG. 6 is a view illustrating temperature dependence of refractive indices of a core and a cladding in the second embodiment of the present invention.

In the drawing, n, $\Delta T$, $n_{core}$, and $n_{clad}$ represent the refractive index, temperature difference from normal temperature (in degrees C.), the refractive index of the core, and the refractive index of the cladding, respectively.

In this embodiment, a glass material, specifically, Er/Qx (product name of Kigre, Inc.) being a type of Er:Glass is used as the optical material of a core 1.

The core 1 is a laser medium as in the above-described first embodiment.

A glass material, specifically, S-TIL6 (product name of OHARA INC.) is used as the optical material of claddings 2a and 2b.

This is an example of a case in which a supposed wavelength λ of light is 1.535 µm.

From FIG. 6, it is understood that there is a temperature range in which the temperature characteristic of the refractive index of the core 1 is negative and the temperature characteristic of the claddings 2a and 2b is positive as in the above-described first embodiment.

Figure 7:
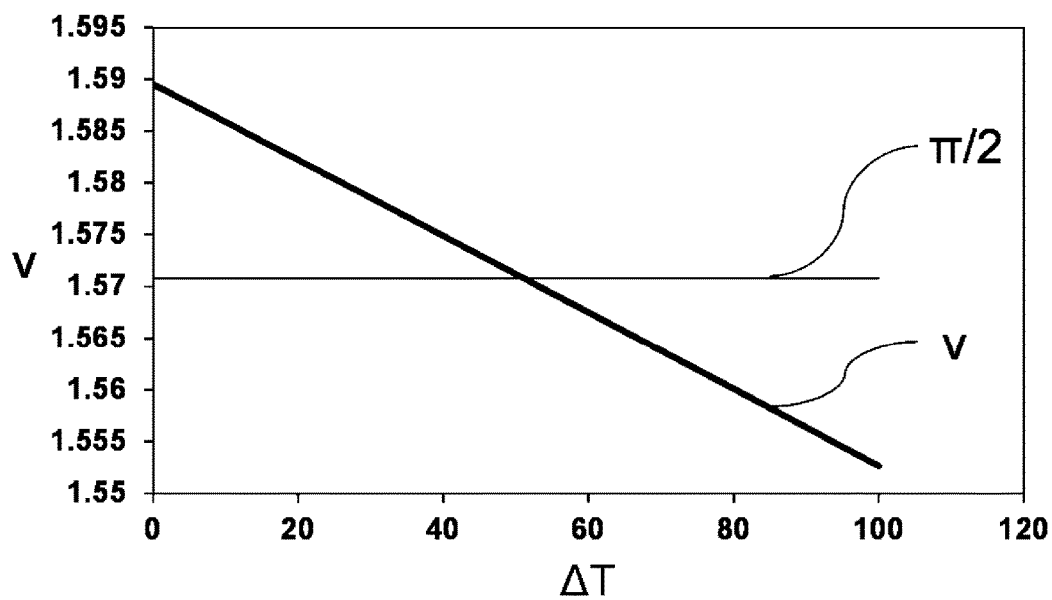
FIG. 7 is a view illustrating temperature dependence of a normalized frequency in the second embodiment of the present invention.

FIG. 7 is a view illustrating temperature dependence of a normalized frequency in this embodiment.

A value of a normalized frequency v is calculated based on a value in FIG. 6 described above.

This is an example of a case in which thickness t of the core 1 is 5.1 µm.

From FIG. 7, it is understood that the normalized frequency v decreases across a cutoff frequency ($v_1 = \pi/2$) for a first-order guided mode along with an increase in temperature from the normal temperature ($\Delta T=0$) in the above-described temperature range.

That is to say, it is understood that, in the optical waveguide 200 at the normal temperature, that is to say, in a state of being mounted in an optical device 500 or in a state in which the optical device is not used, up to the first-order guided mode may propagate through the optical waveguide 200, and the first-order guided mode cannot propagate and only a zeroth-order guided mode may propagate through the optical waveguide 200 at high temperature ($\Delta T \geq 52$).

This means that the optical waveguide 200 heated to the high temperature ($\Delta T \geq 52$) by a temperature control unit 400 and a temperature controlling element 300 equivalently becomes the optical waveguide 200 for the zeroth-order guided mode.

Therefore, it is understood that, when the optical device 500 is provided with the optical waveguide 200 prepared with selected thickness t of the core 1 such that up to the first-order guided mode may propagate therethrough and a temperature control unit 400 controls a temperature controlling element 300 to heat to temperature at which the normalized frequency v is lower than a first-order cutoff frequency $v_1$ ($\Delta T \geq 52$) when the optical device 500 is used, the guided mode of light propagating through the optical waveguide 200 when the optical device 500 operates may be limited to the zeroth-order guided mode.

Figure 8:
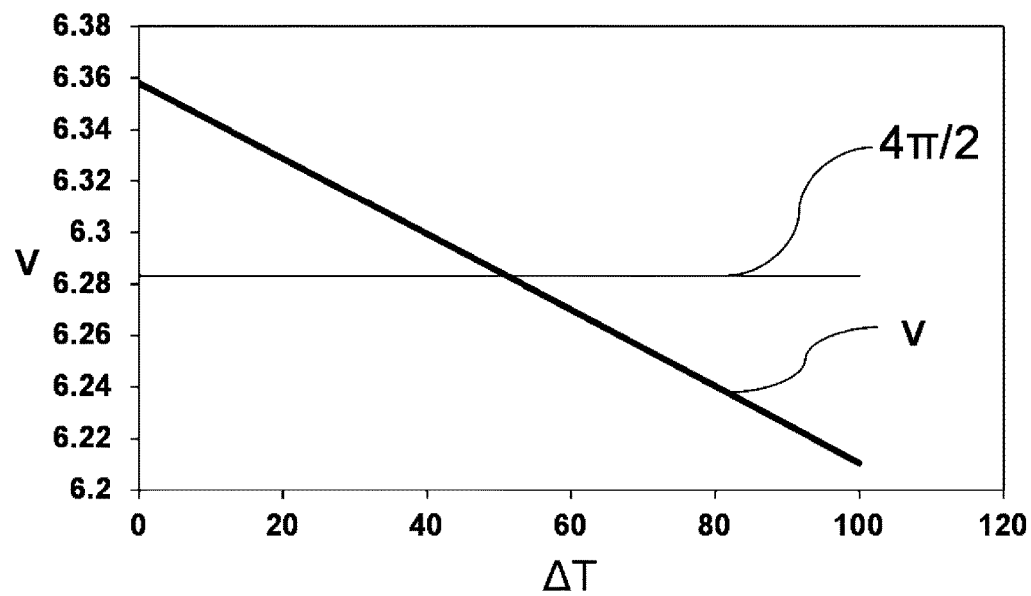
FIG. 8 is a view illustrating a variation of the temperature dependence of the normalized frequency in the second embodiment of the present invention.

FIG. 8 is a view illustrating a variation of the temperature dependence of the normalized frequency v in this embodiment.

This is an example of a case in which the thickness t of the core 1 is 20.4 µm.

From FIG. 8, it is understood that the normalized frequency v specified from a structure of the optical waveguide 200 by equation (1) described above changes across a cutoff frequency ($v_4 = 4\pi/2$) for a fourth-order guided mode obtained from equation (2) described above in the above-described temperature range.

That is to say, it is understood that up to the fourth-order guided mode may propagate through the optical waveguide 200 at normal temperature, and at the time of heating ($\Delta T \geq 52$), the fourth-order guided mode cannot propagate and only third or lower-order guided mode may propagate through the optical waveguide 200.

This means that the optical waveguide 200 heated to the high temperature ($\Delta T \geq 52$) by the temperature control unit 400 and the temperature controlling element 300 equivalently becomes the optical waveguide for the third or lower-order guided mode.

Therefore, it is understood that, when the optical device 500 is provided with the optical waveguide 200 prepared with selected thickness t of the core 1 such that up to the fourth-order guided mode may propagate therethrough and the temperature control unit 400 controls the temperature controlling element 300 to heat to temperature at which the normalized frequency is lower than a fourth-order cutoff frequency ($\Delta T \geq 52$) when the optical device 500 is used, the guided mode of the light propagating through the optical waveguide 200 when the optical device 500 operates may be limited to the third or lower-order guided mode.

As described above, the optical device 500 of this embodiment has an effect similar to that of the above-described first embodiment.

Although Er:Glass is used as the optical material (glass material) of the core 1 in the description above, Er:Yb:Glass, for example, Er/Yb co-doped phosphate glass may also be used. Adjusting a manufacturing condition for Er/Yb co-doped phosphate glass may provide a refractive index characteristic similar to that of Er/Qx (product name of Kigre, Inc.) described above, so that a degree of freedom in preparing the optical waveguide 200 and the optical device 500 increases.

Third Embodiment

Hereinafter, a third embodiment of the present invention will be described with reference to FIGS. 9 to 11.

The component and operation the same as or similar to those of the above-described embodiments are not described.

Figure 9:
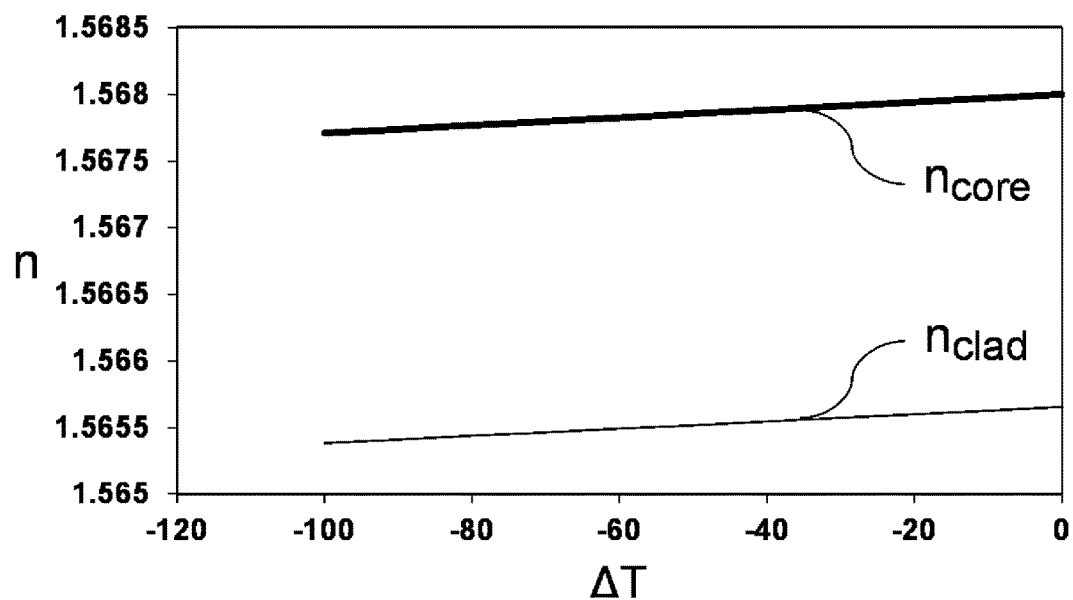
FIG. 9 is a view illustrating temperature dependence of refractive indices of a core and a cladding in a third embodiment of the present invention.

FIG. 9 is a view illustrating temperature dependence of refractive indices of a core and a cladding in the third embodiment of the present invention. The drawing is similar to that of the above-described second embodiment.

In this embodiment, a glass material, specifically, Nd:Q-246 (product name of Kigre, Inc.) being a type of Nd:Glass is used as an optical material of a core 1.

The core 1 is a laser medium as in the above-described first embodiment.

A glass material, specifically, S-TIL25 (product name of OHARA INC.) is used as an optical material of claddings 2a and 2b.

This is an example of a case in which a supposed wavelength λ of light is 1.062 µm.

From FIG. 9, it is understood that the core 1 and the claddings 2a and 2b have a temperature range in which temperature characteristics of both the refractive indices are positive different from the above-described first and second embodiments.

Figure 10:
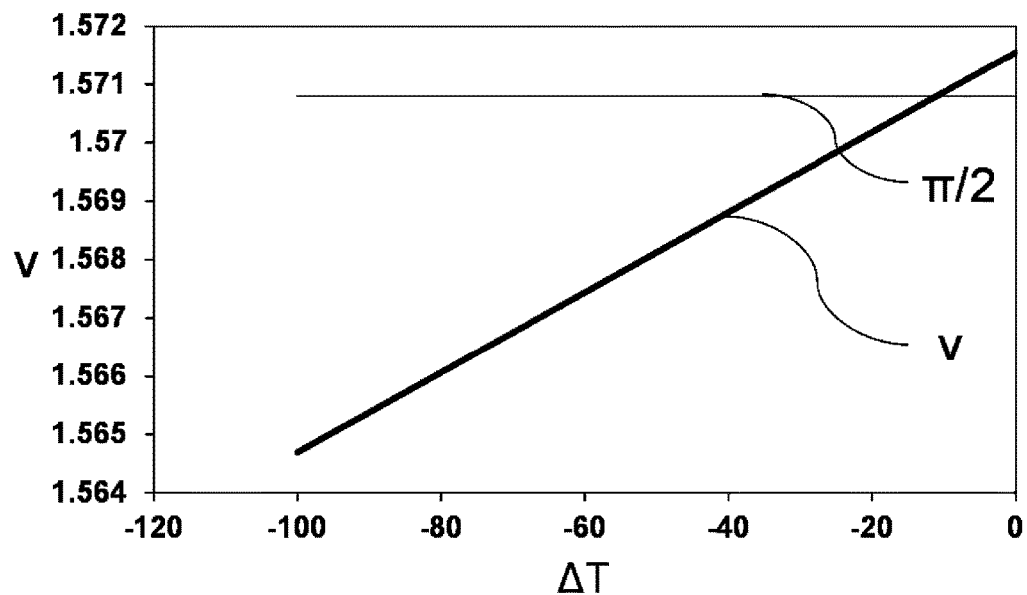
FIG. 10 is a view illustrating temperature dependence of a normalized frequency in the third embodiment of the present invention.

FIG. 10 is a view illustrating temperature dependence of a normalized frequency in this embodiment.

The drawing is similar to that of the above-described second embodiment.

This is an example of a case in which thickness t of the core 1 is 6.2 μm.

From FIG. 10, it is understood that a normalized frequency v decreases across a cutoff frequency ($v_1=\pi/2$) for a first-order guided mode with a decrease in temperature from the normal temperature ($\therefore \Delta T=0$) in the above-described temperature range.

That is to say, it is understood that up to the first-order guided mode may propagate through the optical waveguide 200 at the normal temperature, and at low temperature ($\Delta T \leq -12$), the first-order guided mode cannot propagate and only a zeroth-order guided mode may propagate through the optical waveguide 200.

This means that the optical waveguide 200 cooled to the low temperature ($\Delta T \leq -12$) by a temperature control unit 400 and a temperature controlling element equivalently becomes the optical waveguide for the zeroth-order guided mode.

Therefore, it is understood that, when an optical device 500 is provided with the optical waveguide 200 prepared with selected thickness t of the core 1 such that up to the first-order guided mode may propagate therethrough and the temperature control unit 400 controls the temperature controlling element 300 to cool to temperature at which a normalized frequency v is lower than a first-order cutoff frequency $v_1$ ($\Delta T \leq -12$) when the optical device 500 is used, the guided mode of light propagating through the optical waveguide 200 when the optical device 500 operates may be limited to the zeroth-order guided mode.

Figure 11:
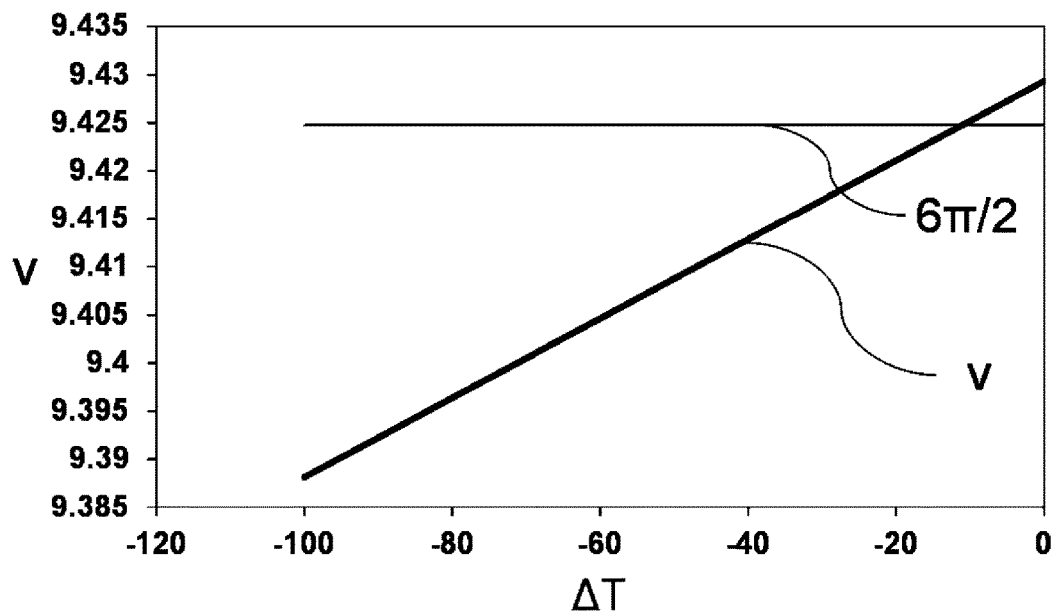
FIG. 11 is a view illustrating a variation of the temperature dependence of the normalized frequency in the third embodiment of the present invention.

FIG. 11 is a view illustrating a variation of the temperature dependence of the normalized frequency v in this embodiment. The drawing is similar to that of the above-described second and third embodiments.

This is an example of a case in which the thickness t of the core 1 is 37.2 μm.

From FIG. 11, it is understood that the normalized frequency v changes across a cutoff frequency ($v_6=6\pi/2$) in the above-described temperature range.

That is to say, it is understood that up to a sixth-order guided mode may propagate through the optical waveguide 200 at the normal temperature, the sixth-order guided mode cannot propagate when it is cooled (for example, $\Delta T \leq -12$) and fifth to zeroth-order guided modes may propagate the optical waveguide 200.

This means that the optical waveguide 200 cooled to the low temperature ($\Delta T \leq -12$) by the temperature control unit 400 and the temperature controlling element equivalently becomes the optical waveguide for a fifth or lower-order guided mode.

Therefore, it is understood that, when the optical device 500 is provided with the optical waveguide 200 prepared with selected thickness t of the core 1 such that up to the sixth-order guided mode may propagate therethrough and the temperature control unit 400 controls the temperature controlling element 300 to cool to temperature at which the normalized frequency is lower than a sixth-order cutoff frequency ($\Delta T \leq -12$) when the optical device 500 is used, the guided mode of the light propagating through the optical waveguide 200 when the optical device 500 operates may be limited to the fifth or lower-order guided mode.

As described above, the optical device 500 of this embodiment has an effect similar to that of the above-described first embodiment.

Although Nd:Q-246 (product name of Kigre, Inc.) being a type of Nd:Glass is specified as the optical material (glass material) of the core 1 in the description above, it is also possible to use Nd doped quartz glass. Adjusting a manufacturing condition for Nd doped quartz glass may provide a refractive index characteristic similar to that of Nd:Q-246 (product name of Kigre, Inc.) described above, so that a degree of freedom in preparing the optical waveguide 200 and the optical device 500 increases.

Fourth Embodiment

Hereinafter, a fourth embodiment of the present invention will be described with reference to FIGS. 12 to 14.

The component and operation the same as or similar to those of the above-described embodiments are not described.

Figure 12:
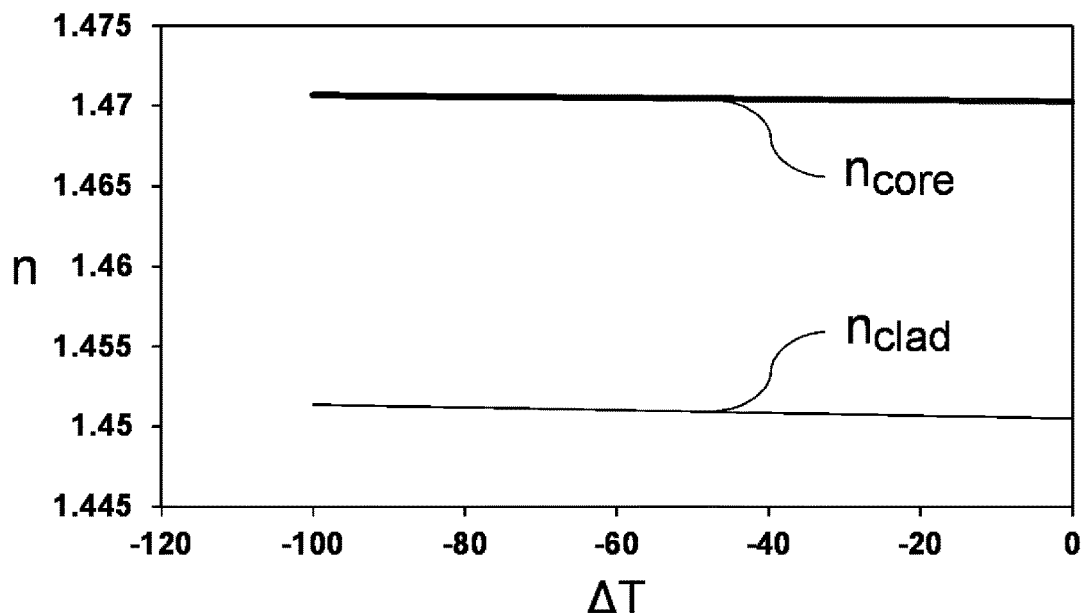
FIG. 12 is a view illustrating temperature dependence of refractive indices of a core and a cladding in a fourth embodiment of the present invention.

FIG. 12 is a view illustrating temperature dependence of refractive indices of a core and a cladding in the fourth embodiment of the present invention. The drawing is similar to that of the above-described second and third embodiments.

In this embodiment a crystal material, specifically, Nd:YLF is used as an optical material of a core 1.

The core 1 is a laser medium as in the above-described first embodiment.

A glass material, specifically, Corning7980 (product name of CORNING Incorporation) is used as an optical material of claddings 2a and 2b.

This is an example of a case in which a supposed wavelength λ of light is 1.047 μm.

From FIG. 12, it is understood that the core 1 and the claddings 2a and 2b have a temperature range in which temperature characteristics of both the refractive indices are negative different from the above-described first to third embodiments.

Figure 13:
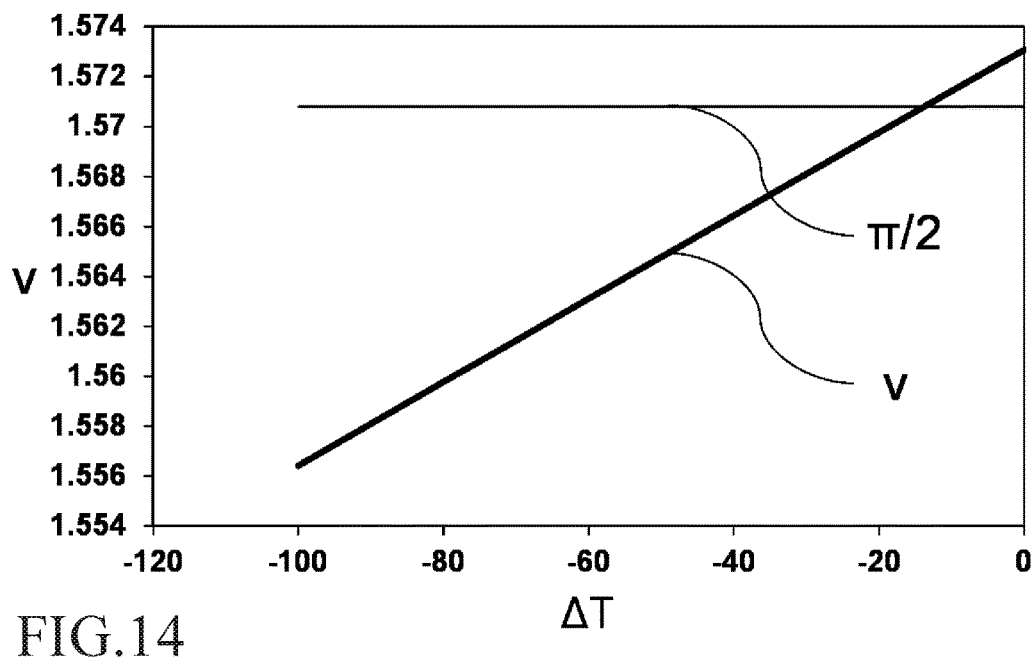
FIG. 13 is a view illustrating temperature dependence of a normalized frequency in the fourth embodiment of the present invention.

FIG. 13 is a view illustrating temperature dependence of a normalized frequency in this embodiment.

The drawing is similar to that of the above-described second and third embodiments.

This is an example of a case in which thickness t of the core 1 is 2.17 μm.

From FIG. 13, it is understood that a normalized frequency v decreases across a cutoff frequency ($v_1=\pi/2$) for a first-order guided mode along with a decrease in temperature from the normal temperature in the above-described temperature range.

This means that an optical waveguide 200 cooled to low temperature ($\Delta T \leq -14$) by a temperature control unit 400 and a temperature controlling element 300 equivalently becomes the optical waveguide 200 for a zeroth-order guided mode.

Therefore, it is understood that, when an optical device 500 is provided with the optical waveguide 200 prepared with selected thickness t of the core 1 such that up to the first-order guided mode may propagate therethrough and the temperature control unit 400 controls the temperature controlling element 300 to cool to temperature at which the normalized frequency v is lower than a first-order cutoff frequency $v_1$ ($\Delta T \leq -14$) when the optical device 500 is used, the guided mode of light propagating through the optical waveguide 200 when the optical device 500 operates may be limited to the zeroth-order guided mode.

Figure 14:
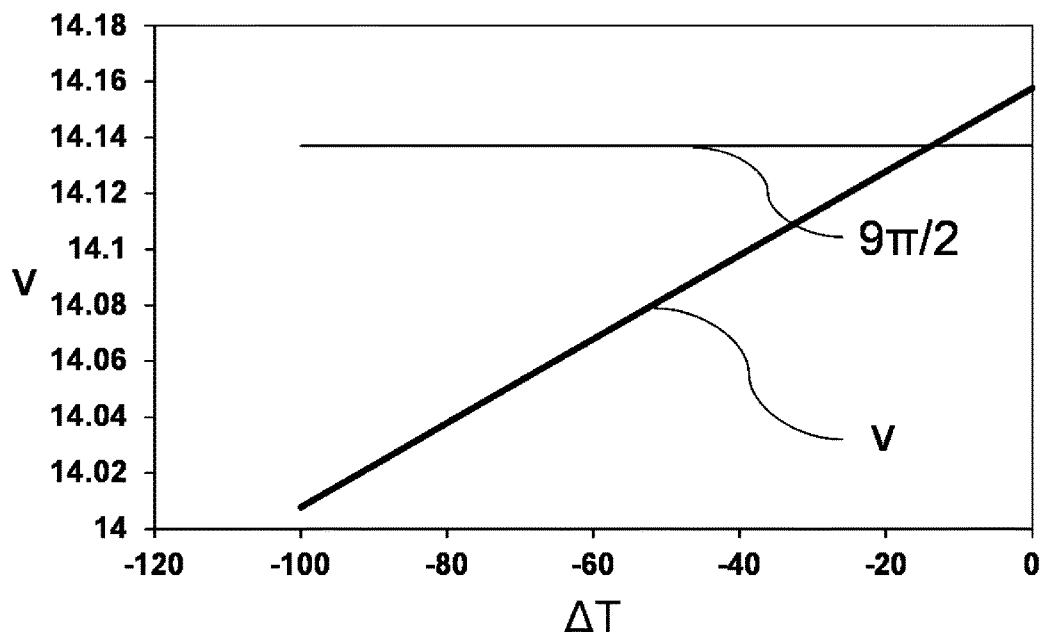
FIG. 14 is a view illustrating a variation of the temperature dependence of the normalized frequency in the fourth embodiment of the present invention.

FIG. 14 is a view illustrating a variation of the temperature dependence of the normalized frequency in this embodiment. The drawing is similar to that of the above-described second and third embodiments.

A characteristic of the drawing is that of a case in which the thickness t of the core 1 is 19.53 μm.

From FIG. 14, it is understood that the normalized frequency v changes across a cutoff frequency ($v_9=9\pi/2$) for a ninth-order guided mode.

This means that the optical waveguide 200 cooled to the low temperature ($\Delta T \leq -14$) by the temperature control unit 400 and the temperature controlling element 300 equivalently becomes the optical waveguide 200 for an eighth or lower-order guided mode.

Therefore, it is understood that, when the optical device 500 is provided with the optical waveguide 200 prepared with selected thickness t of the core 1 such that up to the ninth-order guided mode may propagate therethrough and the temperature control unit 400 controls the temperature controlling element 300 to cool to temperature at which the normalized frequency is lower than the ninth-order cutoff frequency (ΔT≤−14) when the optical device 500 is used, the guided mode of the light propagating through the optical waveguide 200 when the optical device 500 operates may be limited to the eighth or lower-order guided mode.

As described above, the optical device 500 of this embodiment has an effect similar to that of the above-described first embodiment.

Fifth Embodiment

Hereinafter, a fifth embodiment of the present invention will be described with reference to FIGS. 15 to 17.

The component and operation the same as or similar to those of the above-described embodiments are not described.

Figure 15:
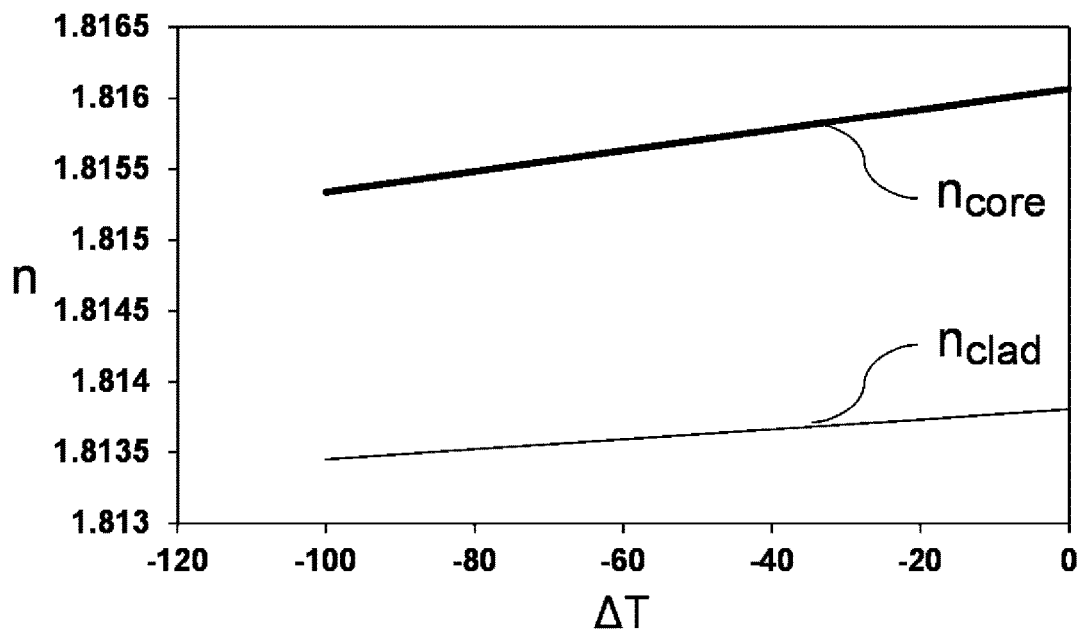
FIG. 15 is a view illustrating temperature dependence of refractive indices of a core and a cladding in a fifth embodiment of the present invention.

FIG. 15 is a view illustrating temperature dependence of refractive indices of a core and a cladding in the fifth embodiment of the present invention. The drawing is similar to that of the above-described second to fourth embodiments.

In this embodiment, a crystal material, specifically, Yb:YAG is used as an optical material of a core 1.

The core 1 is a laser medium as in the above-described first embodiment.

A glass material, specifically, S-LAH55V (product name of OHARA INC.) is used as an optical material of claddings 2a and 2b.

This is an example of a case in which a supposed wavelength λ of light is 1.030 μm.

From FIG. 15, it is understood that the core 1 and the claddings 2a and 2b have a temperature range in which temperature characteristics of both the refractive indices are positive.

Figure 16:
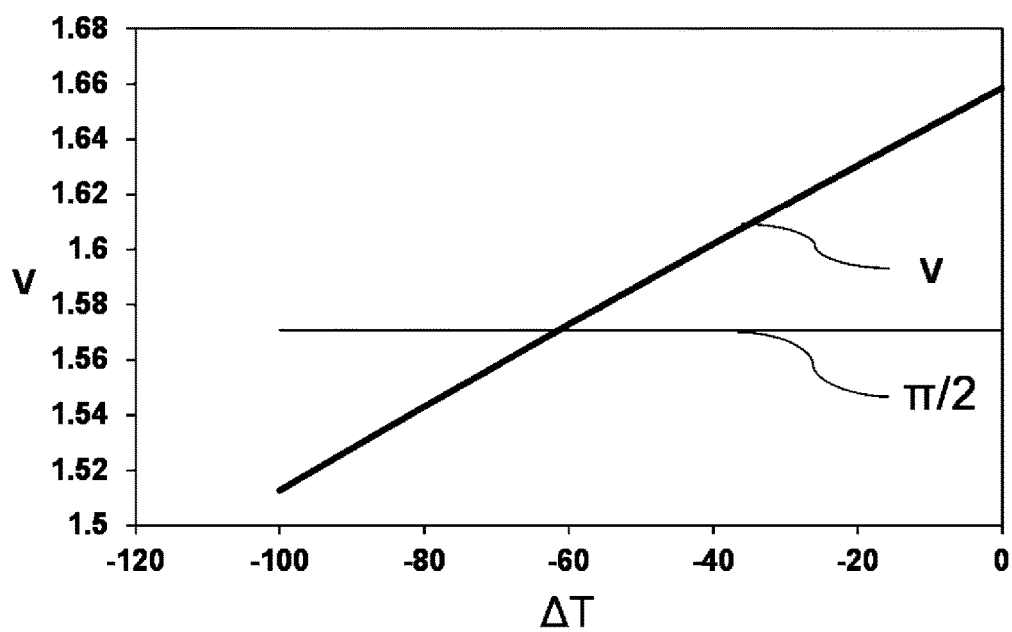
FIG. 16 is a view illustrating temperature dependence of a normalized frequency in the fifth embodiment of the present invention.

FIG. 16 is a view illustrating temperature dependence of a normalized frequency in this embodiment.

The drawing is similar to that of the above-described second to fourth embodiments.

This is an example of a case in which thickness t of the core 1 is 6 μm.

From FIG. 16, it is understood that a normalized frequency v decreases across a cutoff frequency ($v_1=\pi/2$) for a first-order guided mode along with a decrease in temperature from normal temperature in the above-described temperature range.

This means that an optical waveguide 200 cooled to low temperature (ΔT≤−62) by a temperature control unit 400 and a temperature controlling element 300 equivalently becomes the optical waveguide 200 for a zeroth-order guided mode.

Therefore, it is understood that, when an optical device 500 is provided with the optical waveguide 200 prepared with selected thickness t of the core 1 such that up to the first-order guided mode may propagate therethrough and the temperature control unit 400 controls the temperature controlling element 300 to cool to temperature at which the normalized frequency is lower than a first-order cutoff frequency $v_1$ (ΔT≤−62) when the optical device 500 is used, the guided mode of light propagating through the optical waveguide 200 when the optical device 500 operates may be limited to the zeroth-order guided mode.

Figure 17:
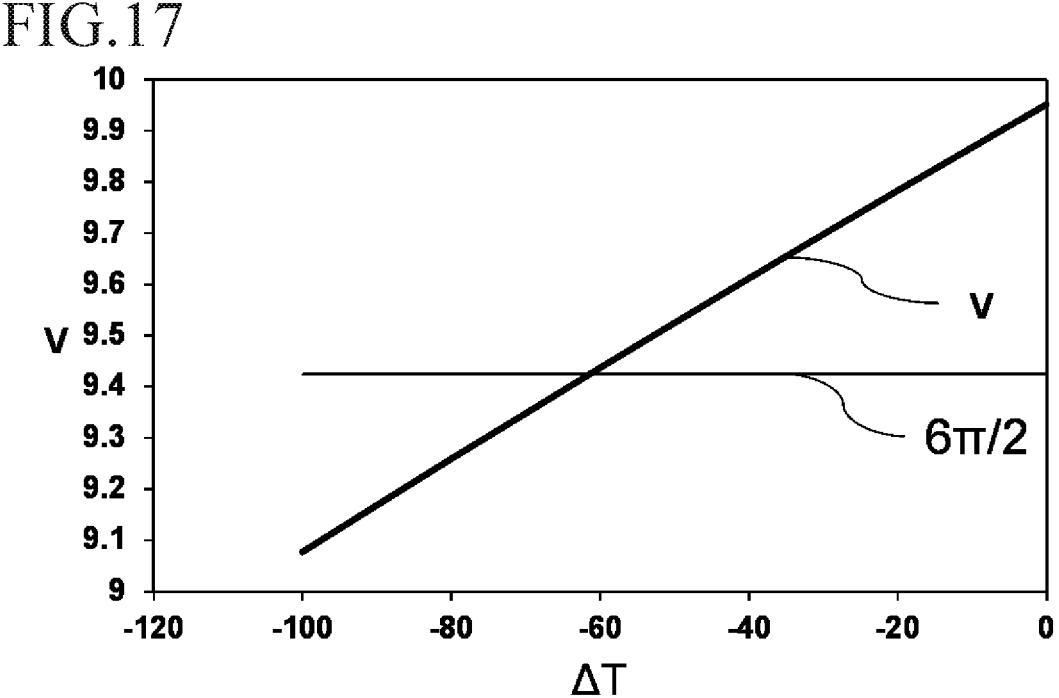
FIG. 17 is a view illustrating a variation of the temperature dependence of the normalized frequency in the fifth embodiment of the present invention.

FIG. 17 is a view illustrating a variation of the temperature dependence of the normalized frequency v in this embodiment. The drawing is similar to that of the above-described second to fourth embodiments.

This is an example of a case in which the thickness t of the core 1 is 36 μm.

From FIG. 17, it is understood that the normalized frequency v changes across a cutoff frequency ($v_6=6\pi/2$) for a sixth-order guided mode in the above-described temperature range.

This means that the optical waveguide 200 cooled to low temperature (ΔT≤−62) by the temperature control unit 400 and the temperature controlling element 300 equivalently becomes the optical waveguide 200 for a fifth or lower-order guided mode.

Therefore, it is understood that, when the optical device 500 is provided with the optical waveguide 200 prepared with selected thickness t of the core 1 such that up to the sixth-order guided mode may propagate therethrough as the optical waveguide 200 used in the optical device 500 and the temperature control unit 400 controls the temperature controlling element 300 to cool to temperature at which the normalized frequency is lower than a sixth-order cutoff frequency (ΔT≤−62) when the optical device 500 is used, the guided mode of the light propagating through the optical waveguide 200 when the optical device 500 operates may be limited to the fifth or lower-order guided mode.

As described above, the optical device 500 of this embodiment has an effect similar to that of the above-described first embodiment.

Sixth Embodiment

Hereinafter, a sixth embodiment of the present invention will be described with reference to FIGS. 18 to 20.

The component and operation the same as or similar to those of the above-described embodiments are not described.

In this embodiment, a glass material, specifically, Er/Qx (product name of Kigre, Inc.) being Er:Glass is used as an optical material of a core 1.

The core 1 is a laser medium as in the above-described first embodiment.

A crystal material being a birefringent material, specifically, calcite is used as an optical material of claddings 2a and 2b.

Laser light whose polarization direction is parallel to a y-axis is used as the laser light.

Figure 18:
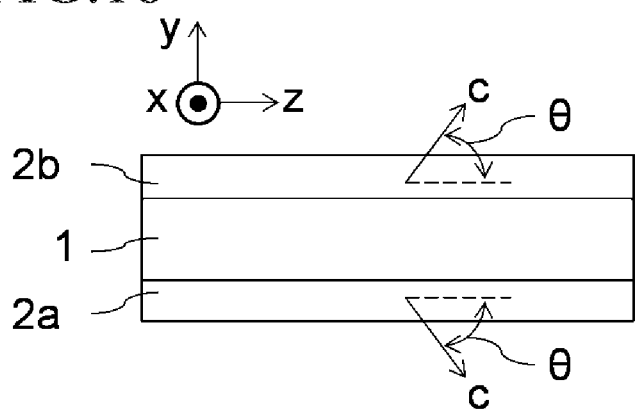
FIG. 18 is a cross-sectional view illustrating an optical waveguide in a sixth embodiment of the present invention.

FIG. 18 is a cross-sectional view illustrating an optical waveguide in the sixth embodiment of the present invention.

In the drawing, a reference numeral 1 represents the core, reference numerals 2a and 2b represent the claddings, and x, y, and z represent convenient coordinate axes. Also, c and θ represent a c-axis being a crystal axis of calcite and an angle between the c-axis and a z-axis (optical axis of the optical waveguide, indicated by a dotted line in the drawing), respectively.

This embodiment is an example of a case in which the c-axis of calcite is perpendicular to the x-axis. Calcite has a crystal structure so-called uniaxial crystal and exhibits so-called anisotropy that a refractive index differs in a specific one axial direction of the crystal.

Figure 19:
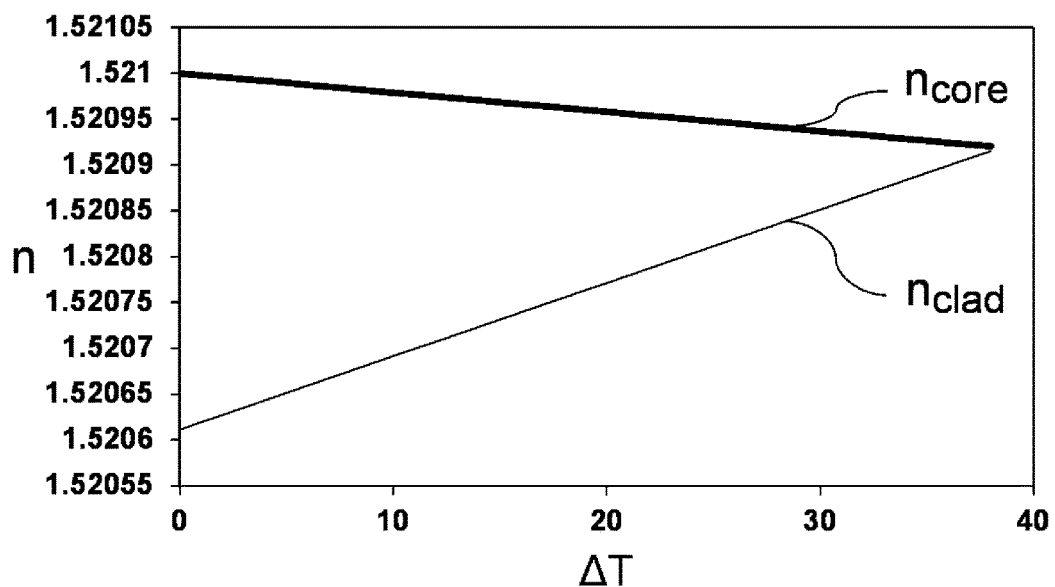
FIG. 19 is a view illustrating temperature dependence of refractive indices of a core and a cladding in the sixth embodiment of the present invention.

FIG. 19 is a view illustrating temperature dependence of the refractive index sensed by the laser light in the core and the cladding in the sixth embodiment of the present invention. The drawing is similar to that of the above-described second to fifth embodiments.

This is an example of a case in which a supposed wavelength λ of the light is 1.535 μm and the angle θ of calcite is 56.3 degrees.

From FIG. 19, it is understood that there is a temperature range in which a temperature characteristic of the refractive index of the core 1 is negative and the temperature characteristic of the refractive index of the claddings 2a and 2b is positive.

Figure 20:
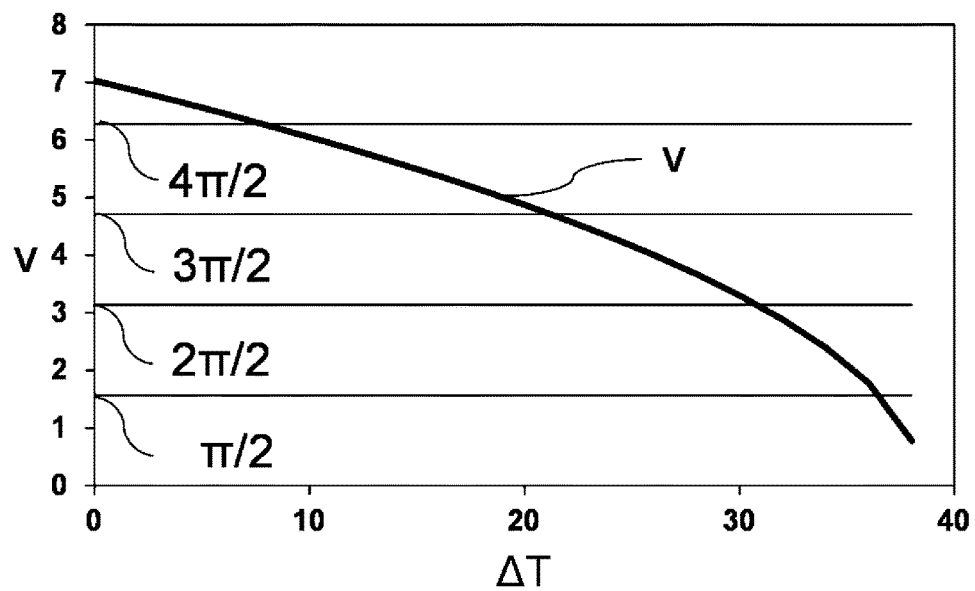
FIG. 20 is a view illustrating temperature dependence of a normalized frequency in the sixth embodiment of the present invention.

FIG. 20 is a view illustrating temperature dependence of a normalized frequency in the sixth embodiment.

The drawing is similar to that of the above-described second to fifth embodiments.

This is an example of a case in which thickness t of the core 1 is 100 μm.

From FIG. 20, it is understood that a normalized frequency ν decreases across cutoff frequencies ($v_4=4\pi/2, \ldots, v_1=\pi/2$) for fourth to first-order guided modes along with an increase in temperature from the normal temperature in the above-described temperature range.

This means that an optical waveguide 200 heated by a temperature control unit 400 and a temperature controlling element 300 equivalently becomes the optical waveguide for the third or lower-order guided mode in a first temperature change range ($8 \leq \Delta T \leq 22$), equivalently becomes the optical waveguide for the second or lower-order guided mode in a second temperature change range ($22 \leq \Delta T \leq 30$), equivalently becomes the optical waveguide for the first or lower-order guided mode in a third temperature change range ($30 \leq \Delta T \leq 36$), and becomes the optical waveguide for a zeroth-order guided mode in a fourth temperature change range ($36 \leq \Delta T$).

Therefore, it is understood that, when an optical device 500 is provided with the optical waveguide 200 prepared with selected thickness t of the core 1 such that up to the fourth-order guided mode may propagate therethrough and the temperature control unit 400 controls the temperature controlling element 300 to heat to temperature at which the normalized frequency ν is lower than a first-order cutoff frequency $v_1$, for example, when the optical device 500 is used, the guided mode of light propagating through the optical waveguide 200 when the optical device 500 operates may be limited to the zeroth-order guided mode.

It is also possible to configure the optical device in which setting of temperature change is changed or the optical device in which the setting may be changed according to a use object of the optical device 500 and a highest order of the guided mode of the light allowed or used in the optical device 500.

As described above, the optical device 500 of this embodiment has an effect similar to that of the above-described first embodiment.

Since it is possible to equivalently change the refractive index of the claddings 2a and 2b sensed by the light propagating through the optical waveguide 200 by preparing the claddings 2a and 2b of the optical waveguide 200 with different angles θ, it is possible to increase parameters when preparing the optical waveguide 200 and a degree of freedom in preparing the optical waveguide 200 and the optical device 500 increases.

In FIG. 20, it is possible to set the thickness t of the core 1 to 100 μm so as to be thicker than that of the above-described embodiments, so that a manufacturing condition may be further relaxed.

It is possible to configure to step across the cutoff frequency in the temperature change range smaller than that of the above-described embodiments by using a combination of the optical materials of the core 1 and the claddings 2a and 2b in this embodiment, so that a configuration and control of temperature controller 600 may be simplified.

Since a temperature change amount from normal temperature is small, it is possible to decrease an effect due to the temperature on the optical waveguide 200 and other components forming the optical device 500, for example, deterioration in electric characteristic caused by mechanical deformation.

Since the same optical waveguide 200 may be provided when preparing a plurality of optical devices 500 with the different highest orders of the guided mode allowed in the optical device 500, common parts may be used and reduction in cost of preparing the optical waveguide 200 and the optical device 500 is realized.

Although Er:Glass is used as the optical material (glass material) of the core 1 in the description above, Er/Yb co-doped phosphate glass may also be used as in the above-described second embodiment and the degree of freedom in preparing the optical waveguide 200 and the optical device 500 increases.

Seventh Embodiment

Hereinafter, a seventh embodiment of the present invention will be described with reference to FIGS. 21 and 22.

The component and operation the same as or similar to those of the above-described embodiments are not described.

In this embodiment, a glass material, specifically, Nd:Q-246 (product name of Kigre, Inc.) being Nd:Glass is used as an optical material of a core 1.

The core 1 is a laser medium as in the above-described first embodiment.

A crystal material being a birefringent material, specifically, BBO is used as an optical material of claddings 2a and 2b.

A cross-sectional view illustrating an optical waveguide in this embodiment is similar to FIG. 18 in the above-described sixth embodiment.

In this case, c and θ represent a c-axis being a crystal axis of BBO and an angle between the c-axis and a z-axis (optical axis of the optical waveguide, indicated by a dotted line in the drawing), respectively.

This embodiment is an example of a case in which the c-axis of BBO is perpendicular to the x-axis.

Laser light whose polarization direction is parallel to a y-axis is used as the laser light.

Figure 21:
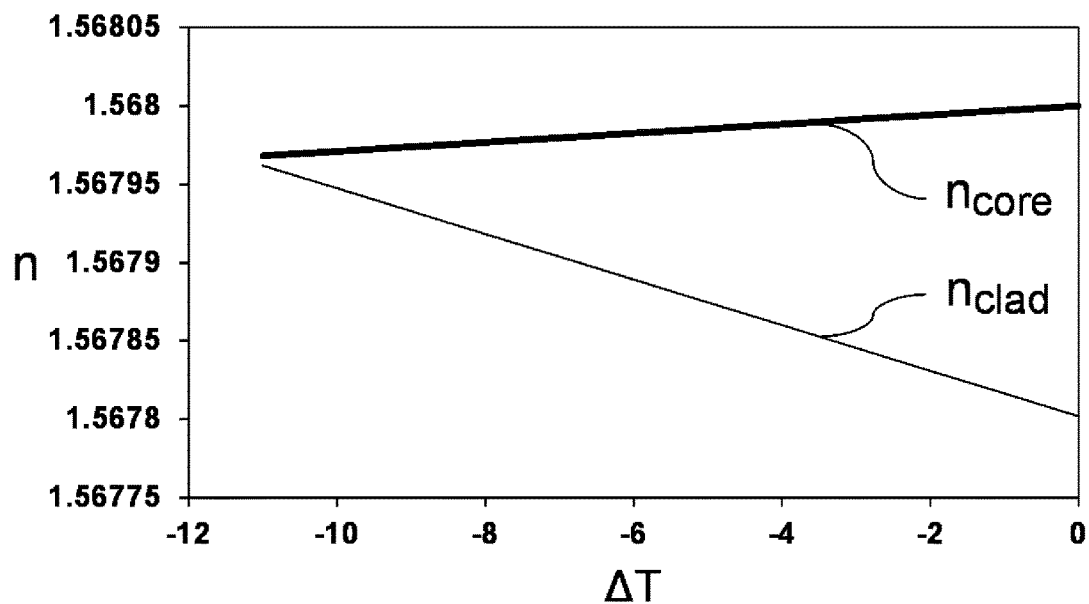
FIG. 21 is a view illustrating temperature dependence of refractive indices of a core and a cladding in a seventh embodiment of the present invention.

FIG. 21 is a view illustrating temperature dependence of refractive indices sensed by the laser light in the core and the cladding in the seventh embodiment of the present invention.

The drawing is similar to that of the above-described second embodiment.

This is an example of a case in which a supposed wavelength λ of the light is 1.062 μm and the angle θ of BBO is 54.7 degrees.

From FIG. 21, it is understood that there is a temperature range in which a temperature characteristic of the refractive index of the core 1 is positive and a temperature characteristic of the refractive index of the claddings 2a and 2b is negative.

Figure 22:
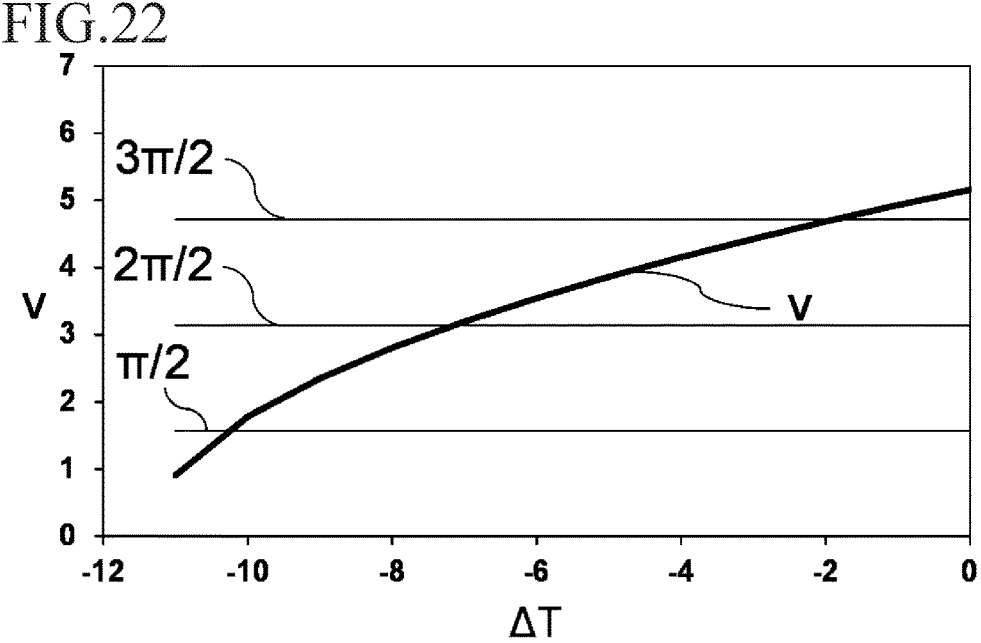
FIG. 22 is a view illustrating temperature dependence of a normalized frequency in the seventh embodiment of the present invention.

FIG. 22 is a view illustrating temperature dependence of a normalized frequency in this embodiment.

The drawing is similar to that of the above-described second to sixth embodiments.

This is an example of a case in which thickness t of the core 1 is 70 μm.

From FIG. 22, it is understood that a normalized frequency ν decreases across cutoff frequencies ($v_3=3\pi/2$, $v_2=2\pi/2$, and $v_1=\pi/2$) for third to first-order guided modes along with a decrease in temperature from normal temperature in the above-described temperature range.

This means that an optical waveguide 200 cooled by a temperature control unit 400 and a temperature controlling element 300 equivalently becomes the optical waveguide for a second or lower-order guided mode in a first temperature change range ($-7.2 \leq \Delta T \leq -1.9$), equivalently becomes the optical waveguide for a first or lower-order guided mode in a second temperature change range ($-10.4 \leq \Delta T \leq -7.2$), and becomes the optical waveguide for a zeroth-order guided mode in a third temperature change range ($\Delta T \leq -10.4$).

Therefore, it is understood that, when an optical device 500 is provided with the optical waveguide 200 prepared with selected thickness t of the core 1 such that up to a third-order guided mode may propagate therethrough and the temperature control unit 400 controls the temperature controlling element 300 to cool to temperature at which the normalized frequency v is lower than a first-order cutoff frequency $v_1$, for example, when the optical device 500 is used, the guided mode of light propagating through the optical waveguide 200 when the optical device 500 operates may be limited to the zeroth-order guided mode.

It is also possible to configure the optical device in which setting of temperature change is changed or the optical device in which the setting may be changed according to a use object of the optical device 500 and a highest order of the guided mode of the light allowed (or used) in the optical device 500.

As described above, the optical device 500 of this embodiment has an effect similar to that of the above-described first embodiment.

Since it is possible to equivalently change the refractive index of the claddings 2a and 2b sensed by the light propagating through the optical waveguide 200 by using the optical waveguides 200 prepared with different angles θ, it is possible to increase parameters when preparing the optical waveguide 200 and a degree of freedom in preparing the optical waveguide 200 and the optical device 500 increases as in the above-described sixth embodiment.

In a case in FIG. 22, it is possible to set the thickness t of the core 1 to 70 μm so as to be thicker, so that a manufacturing condition may be relaxed as in the above-described sixth embodiment.

It is possible to configure such that the normalized frequency v steps across the cutoff frequency in the temperature change range smaller than that of the above-described embodiments by using a combination of the optical materials of the core 1 and the claddings 2a and 2b in this embodiment, so that a configuration and control of temperature controller 600 may be simplified.

Since a temperature change amount from the normal temperature is smaller than that in the above-described sixth embodiment, it is possible to further decrease an effect due to the temperature on components other than the optical waveguide 200 forming the optical device 500, for example, deterioration in electric characteristic caused by mechanical deformation.

Since the same optical waveguide 200 may be provided when preparing a plurality of optical devices 500 with different highest orders of the guided mode allowed or used in the optical device 500, common parts may be used and reduction in cost of preparing the optical waveguide 200 and the optical device 500 is realized as in the above-described sixth embodiment.

Although Nd:Q-246 (product name of Kigre, Inc.) being a type of Nd:Glass is used as the optical material (glass material) of the core 1 in the description above, it is also possible to use Nd doped quartz glass. Adjusting a manufacturing condition for Nd doped quartz glass may provide a refractive index characteristic similar to that of Nd:Q-246 (product name of Kigre, Inc.) described above, so that a degree of freedom in preparing the optical waveguide 200 and the optical device 500 increases.

Eighth Embodiment

Hereinafter, an eighth embodiment of the present invention will be described with reference to FIGS. 23 to 25.

The component and operation the same as or similar to those of the above-described embodiments are not described.

In this embodiment, a crystal material, specifically, Yb:YAG is used as an optical material of a core 1.

The core 1 is a laser medium as in the above-described first embodiment.

A crystal material being a birefringent material, specifically, KTP is used as an optical material of claddings 2a and 2b.

Figure 23:
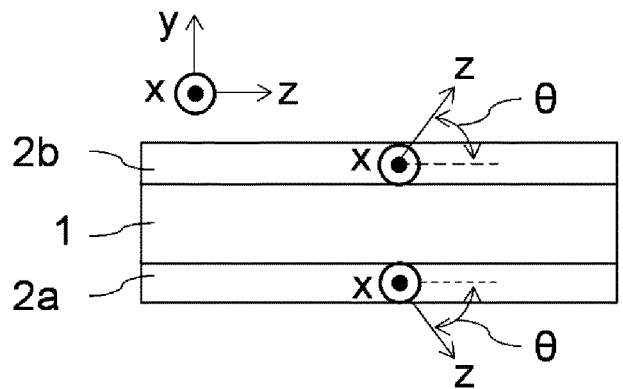
FIG. 23 is a cross-sectional view illustrating an optical waveguide in an eighth embodiment of the present invention.

FIG. 23 is a cross-sectional view illustrating an optical waveguide in the eighth embodiment of the present invention.

In the drawing, a reference numeral 1 represents the core, reference numerals 2a and 2b represent the claddings, $n_{core}$, $n_{clad}$, and t represent a refractive index of the core, a refractive index of the cladding, and thickness of the core 1, respectively, and x, y, and z found outside an optical waveguide 200 in the drawing represent convenient coordinate axes.

Also, x and z found in the claddings 2a and 2b represent an x-axis and a z-axis being crystal axes of KTP, respectively, and θ represents an angle between the z-axis of KTP and the convenient z-axis being an optical axis of the optical waveguide 200.

This embodiment is an example of a case in which the x-axis of KTP is perpendicular to the z-axis being the optical axis.

KTP has a crystal structure so-called biaxial crystal and exhibits so-called anisotropy that the refractive index differs in three axial directions of the crystal.

Laser light whose polarization direction is parallel to a y-axis is used as the laser light.

Figure 24:
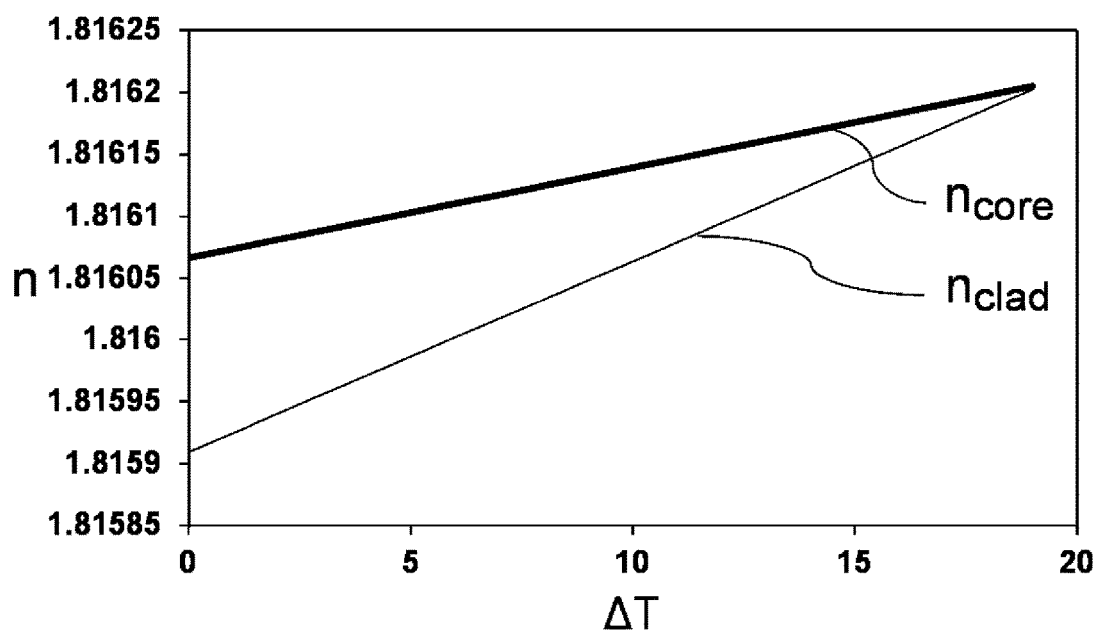
FIG. 24 is a view illustrating temperature dependence of refractive indices of a core and a cladding in the eighth embodiment of the present invention.

FIG. 24 is a view illustrating temperature dependence of the refractive index sensed by the laser light in the core and the cladding in the eighth embodiment of the present invention. The drawing is similar to that of the above-described second to seventh embodiments.

This is an example of a case in which a supposed wavelength λ of the light is 1.030 μm and the angle θ of KTP is 65.4 degrees.

From FIG. 24, it is understood that the core 1 and the claddings 2a and 2b have a temperature range in which temperature characteristics of both the refractive indices are positive.

Figure 25:
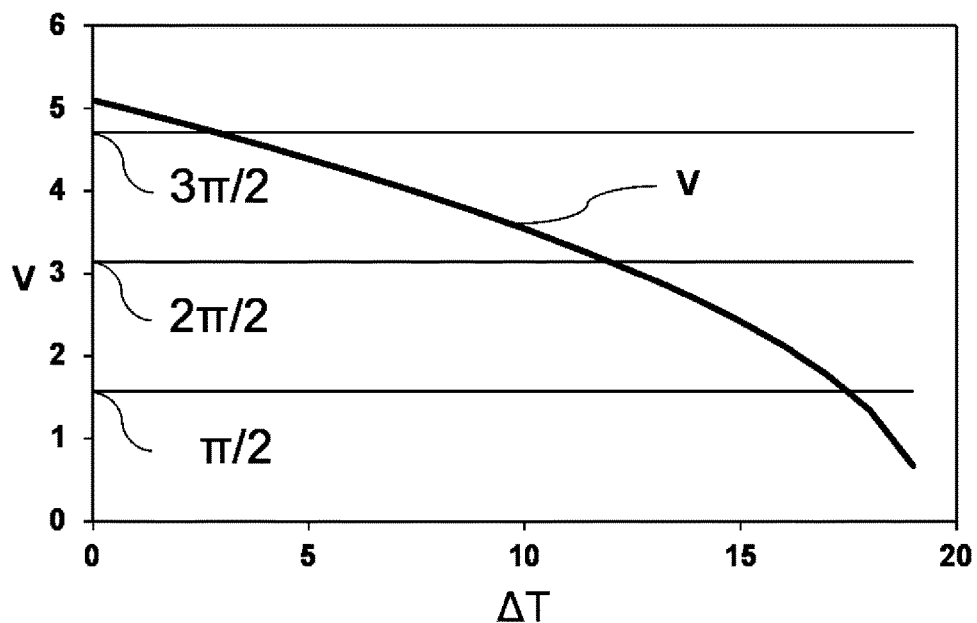
FIG. 25 is a view illustrating temperature dependence of a normalized frequency in the eighth embodiment of the present invention.

FIG. 25 is a view illustrating temperature dependence of a normalized frequency in the eighth embodiment.

The drawing is similar to that of the above-described second to seventh embodiments.

A characteristic of the drawing is that of a case in which the thickness t of the core 1 is 70 μm.

From FIG. 25, it is understood that a normalized frequency v decreases across cutoff frequencies ($v_3=3\pi/2$, $v_2=2\pi/2$, and $v_1=\pi/2$) for third to first-order guided modes along with an increase in temperature from normal temperature in the above-described temperature range.

This means that the optical waveguide 200 heated by a temperature control unit 400 and a temperature controlling element 300 equivalently becomes the optical waveguide for the second or lower-order guided mode in a first temperature change range ($3 \leq \Delta T \leq 13$), equivalently becomes the optical waveguide for the first or lower-order guided mode in a second temperature change range ($13 \leq \Delta T \leq 18$), and equivalently becomes the optical waveguide for a zeroth-order guided mode in a third temperature change range ($18 \leq \Delta T$).

Therefore, it is understood that, when an optical device 500 is provided with the optical waveguide 200 prepared with selected thickness t of the core 1 such that up to the third-order guided mode may propagate therethrough and the temperature control unit 400 controls the temperature controlling element 300 to heat to temperature at which the normalized frequency v is lower than a first-order cutoff frequency $v_1$, for example, when the optical device 500 is used, the guided mode of light propagating through the optical waveguide 200 when the optical device 500 operates may be limited to the zeroth-order guided mode.

It is also possible to configure the optical device in which setting of temperature change is changed or the optical device in which the setting may be changed according to a use object of the optical device 500 and a highest order of the guided mode of the light allowed (or used) in the optical device 500.

As described above, the optical device 500 of this embodiment has an effect similar to that of the above-described first embodiment.

Since it is possible to equivalently change the refractive index of the claddings 2a and 2b sensed by the light propagating through the optical waveguide 200 by using the optical waveguides 200 prepared with different angles θ, it is possible to increase parameters when preparing the optical waveguide 200 and a degree of freedom in preparing the optical waveguide 200 and the optical device 500 increases as in the above-described sixth and seventh embodiments.

In a case of FIG. 25, it is possible to set the thickness t of the core 1 to 70 μm so as to be thicker, so that a manufacturing condition may be further relaxed.

It is possible to configure to step across the cutoff frequency in a temperature change range smaller than that of the above-described embodiments by using a combination of the optical materials of the core 1 and the claddings 2a and 2b in this embodiment, so that a configuration and control of temperature controller 600 may be simplified.

Since a temperature change amount from normal temperature is small, it is possible to decrease an effect due to the temperature on components other than the optical waveguide 200 forming the optical device 500, for example, deterioration in electric characteristic caused by mechanical deformation.

Since the same optical waveguide 200 may be provided when preparing a plurality of optical devices 500 with different highest orders of the guided mode allowed or used in the optical device 500, common parts may be used and reduction in cost of preparing the optical waveguide 200 and the optical device 500 is realized as in the above-described sixth and seventh embodiments.

Ninth Embodiment

Hereinafter, a ninth embodiment of the present invention will be described with reference to FIGS. 26 and 27.

The component and operation the same as or similar to those of the above-described embodiments are not described.

In this embodiment, a glass material, specifically, Nd:LHG-8 (product name of HOYA CORPORATION) being a type of Nd:Glass is used as an optical material of a core 1.

The core 1 is a laser medium as in the above-described first embodiment.

A crystal material being a birefringent material, specifically, BBO is used as an optical material of claddings 2a and 2b.

A cross-sectional view illustrating an optical waveguide 200 in this embodiment is similar to FIG. 18 in the above-described sixth embodiment.

In this regard, in this embodiment, c and θ in the drawing represent a c-axis being a crystal axis of BBO and an angle between the c-axis and a z-axis (optical axis of the optical waveguide), respectively.

This embodiment is an example of a case in which the c-axis of BBO is perpendicular to the x-axis.

Figure 26:
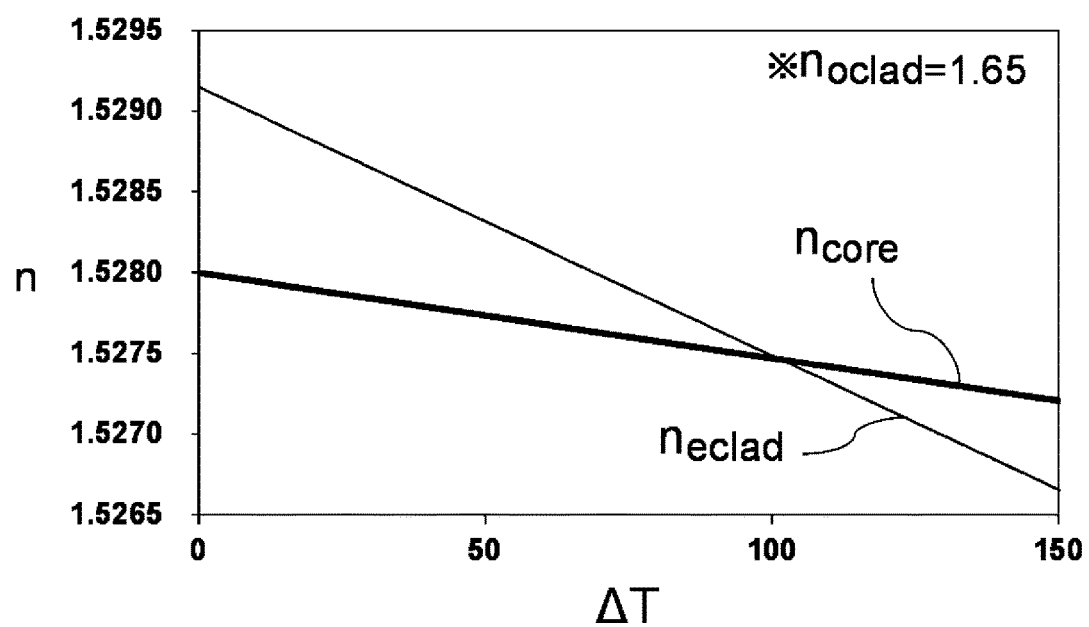
FIG. 26 is a view illustrating temperature dependence of refractive indices of a core and a cladding in a ninth embodiment of the present invention.

FIG. 26 is a view illustrating temperature dependence of the refractive index sensed by laser light in the core and the cladding in the ninth embodiment of the present invention.

In the drawing, $n_{core}$, $n_{eclad}$, and $n_{oclad}$ represent the refractive index of the core, the refractive index of the cladding sensed by the light when a polarization direction is parallel to a y-axis direction in FIG. 18 (hereinafter, referred to as TM polarized light), and the refractive index of the cladding sensed by the light when the polarization direction is parallel to an x-axis direction (hereinafter, referred to as TE polarized light), respectively. A value of $n_{oclad}$ is out of a range of the drawing, so that only the value is described in the drawing. Other than this, the drawing is similar to that of the above-described second to eighth embodiments.

This is an example of a case in which a supposed wavelength λ of the light is 1.054 μm and the angle θ of BBO is 90 degrees.

From FIG. 26, it is understood that there is a temperature range in which temperature characteristics of both the refractive index $n_{core}$ of the core 1 and the refractive index $n_{eclad}$ sensed by the TM polarized light in the claddings 2a and 2b are negative.

It is understood that there is a temperature range in which only the refractive index $n_{eclad}$ for the TM polarized light out of the refractive indices sensed by the lights with different polarization directions in the claddings 2a and 2b is lower than the refractive index $n_{core}$ of the core 1.

Figure 27:
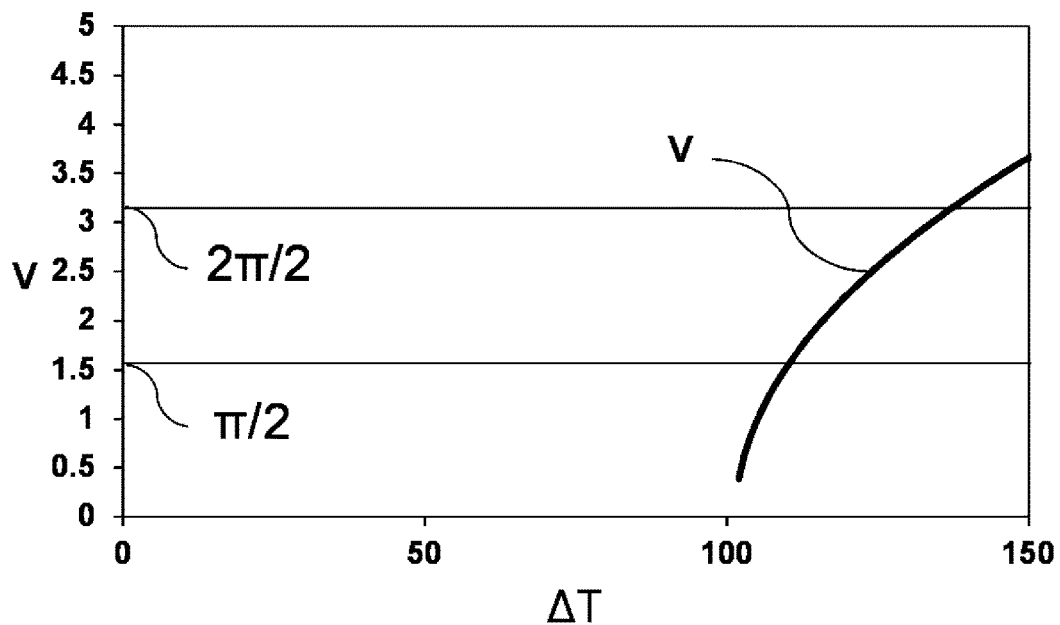
FIG. 27 is a view illustrating temperature dependence of a normalized frequency in the ninth embodiment of the present invention.

FIG. 27 is a view illustrating temperature dependence of a normalized frequency in the ninth embodiment of the present invention. In the drawing, v represents the normalized frequency specified for the TM polarized light. Other than this, the drawing is similar to that of the above-described embodiments. This is an example of a case in which thickness t of the core 1 is 30 μm.

From FIG. 27, it is understood that there is a temperature range in which the normalized frequency v for the TM polarized light decreases across the normalized frequencies ($v_2 = 2\pi/2$ and v: $= \pi/2$) for second and first-order guided modes along with a decrease in temperature from a high temperature side in the drawing.

This means that the optical waveguide 200 heated by a temperature control unit 400 and a temperature controlling element 300 equivalently becomes the optical waveguide for the second or lower-order guided mode in a first temperature change range ($138 \leq \Delta T$), equivalently becomes the optical waveguide for the first or lower-order guided mode in a second temperature change range ($111 \leq \Delta T \leq 138$), and equivalently becomes the optical waveguide for a zeroth-order guided mode in a third temperature change range ($102 \leq \Delta T \leq 111$).

Therefore, it is understood that, when an optical device 500 is provided with the optical waveguide 200 which does not serve as the optical waveguide for the guided mode and it is heated to temperature at which the normalized frequency v for the TM polarized light is lower than a first-order cutoff frequency $v_1$, for example, when the optical device 500 is used, it is possible to limit the guided mode of the light propagating through the optical waveguide 200 when the optical device 500 operates to the zeroth-order guided mode.

It is understood that there is a fourth temperature range ($0 \leq \Delta T \leq 102$) in which there is no normalized frequency v for the TM polarized light on a low temperature side in the drawing. This means that the TM polarized light cannot propagate in the guided mode in the temperature range.

On the other hand, for the TE polarized light, the refractive index $n_{oclad}$ for the TE polarized light does not become lower than the refractive index $n_{core}$ of the core 1 in the temperature range in the drawing, so that the normalized frequency of the guided mode (refer to equation (1) described above) is not specified. This means that the TE polarized light cannot propagate in the guided mode in the temperature range illustrated in the drawing.

Therefore, this means that the optical waveguide 200 heated to high temperature by the temperature control unit 400 and the temperature controlling element 300 becomes the optical waveguide for the guided mode only for the TM polarized light in the first temperature change range to the third temperature range and does not serve as the optical waveguide for the guided mode for both the TM polarized light and TE polarized light in the fourth temperature range.

It is understood that when the optical device 500 is prepared to be provided with the optical waveguide 200 which does not serve as the optical waveguide for the guided mode and the temperature control unit 400 controls the temperature controlling element 300 so as to heat to the temperature at which the refractive index $n_{eclad}$ is lower than the refractive index $n_{core}$ of the core 1 when the optical device 500 is used, it becomes possible to limit the guided mode of the light propagating through the optical waveguide 200 when the optical device 500 operates to one guided mode (TM mode in this embodiment).

As described above, the optical device 500 of this embodiment has an effect similar to that of the above-described first embodiment.

In an application field of the optical device 500, it is often desirable that the light is limited to the light in a single mode in general, so that performance in the application field of the optical device 500 may be improved.

Although it is described by using a combination of Nd:LHG-8 and BBO as the optical materials of the core 1 and the claddings 2a and 2b in this embodiment, the combination is not limited to this.

A combination of the optical materials satisfying conditions that (1) a first refractive index ($n_{eclad}$ in this embodiment) of the claddings 2a and 2b specified for the light polarized in a first polarization direction (TM polarized light in this embodiment) is lower than the refractive index $n_{core}$ of the core 1 and (2) a second refractive index ($n_{oclad}$ in this embodiment) of the claddings 2a and 2b specified for the light polarized in a second polarization direction perpendicular to the first polarization direction (TE polarized light in this embodiment) is higher than the refractive index $n_{core}$ of the core 1 in the temperature range in which the refractive index of the core 1 is higher than the refractive index of the claddings 2a and 2b is a sufficient combination, and it becomes possible to limit the guided mode of the light propagating through the optical waveguide 200 to the guided mode in one polarization direction.

Tenth Embodiment

Hereinafter, a tenth embodiment of the present invention will be described with reference to FIGS. 28 to 30.

The component and operation the same as or similar to those of the above-described embodiments are not described.

In this embodiment, a glass material, specifically, that having a refractive index of 1.538 at normal temperature and a characteristic equivalent to that of QX/Er of Kigre, Inc. as temperature dependence is used as an optical material of a core 1.

The core 1 is a laser medium as in the above-described first embodiment.

In this embodiment, optical materials having different birefringence characteristics are used as optical materials of the claddings 2a and 2b; specifically, CBO is used as the optical material of the cladding 2a and quartz is used as the optical material of the cladding 2b.

Figure 28:
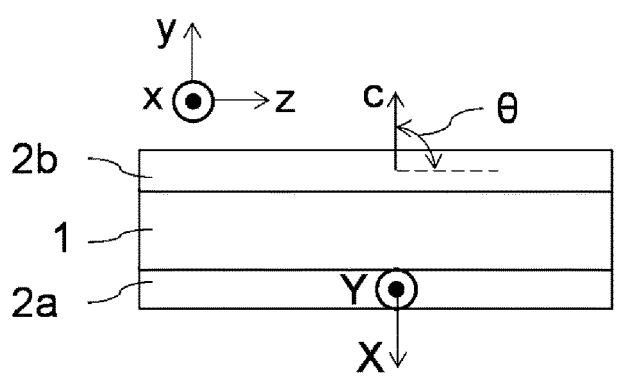
FIG. 28 is a cross-sectional view illustrating an optical waveguide in a tenth embodiment of the present invention.

FIG. 28 is a cross-sectional view illustrating an optical waveguide in the tenth embodiment of the present invention.

In the drawing, a reference numeral 1 represents the core, reference numerals 2a and 2b represent the claddings, and x, y, and z represent convenient coordinate axes. Also, X and Y represent main axes (X-axis and Y-axis) of the refractive indices of CBO, c represents a c-axis being a crystal axis of quartz, and θ represents an angle between the c-axis and a z-axis (optical axis of the optical waveguide, indicated by a broken line in the drawing).

This embodiment is an example of a case in which the X-axis of CBO is parallel to the y-axis and the Y-axis is parallel to the x-axis. This is an example of a case in which the c-axis of CBO is parallel to the y-axis.

Figure 29:
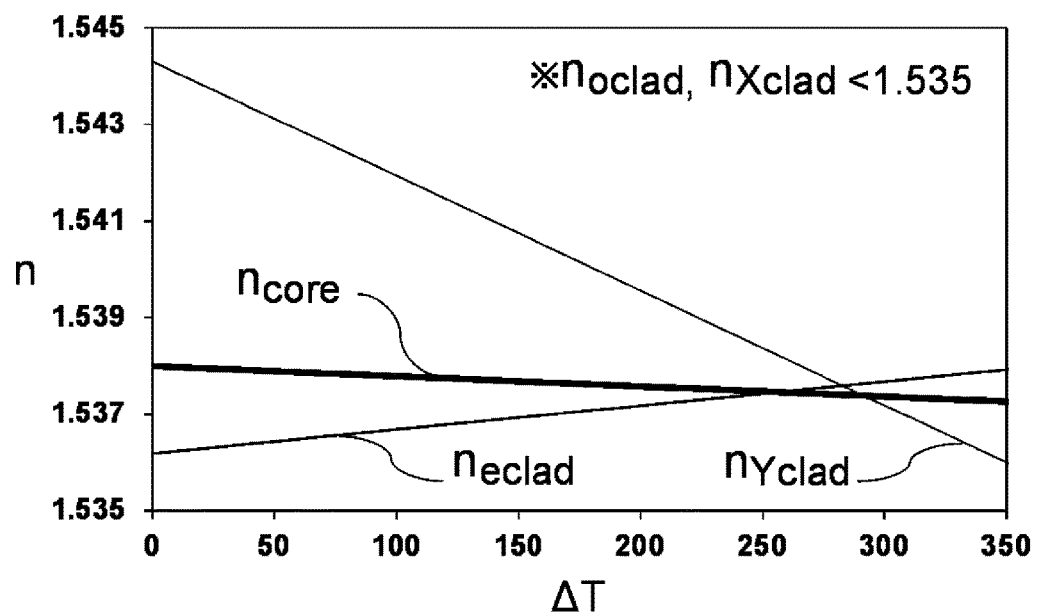
FIG. 29 is a view illustrating temperature dependence of refractive indices of a core and a cladding in the tenth embodiment of the present invention.

FIG. 29 is a view illustrating temperature dependence of the refractive index sensed by laser light in the core and the cladding in the tenth embodiment of the present invention.

In the drawing, $n_{core}$, $n_{Xclad}$, $n_{Yclad}$, $n_{eclad}$, and $n_{oclad}$ represent the refractive index of the core, the refractive index of the cladding 2a sense by TM polarized light in FIG. 28, the refractive index of the cladding 2a sensed by TE polarized light, the refractive index of the cladding 2b sensed by the TM polarized light, and the refractive index of the cladding 2b sensed by the TE polarized light. Values of $n_{Xclad}$ and $n_{oclad}$ are out of a range of the drawing, so that only description is illustrated in the drawing. Other than this, the drawing is similar to that of the above-described second to ninth embodiments.

This embodiment is an example of a case in which a supposed wavelength λ of light is 1.535 μm and an angle θ of quartz is 90 degrees.

From FIG. 29, it is understood that there is a temperature range in which (1) both the refractive indices ($n_{Xclad}$ and $n_{eclad}$) of the claddings 2a and 2b sensed by the TM polarized light are lower than the refractive index $n_{core}$ of the core 1 and (2) one of the refractive indices ($n_{Yclad}$) of the claddings 2a and 2b sensed by the TE polarized light is higher than the refractive index $n_{core}$ of the core 1 on a low temperature side in the drawing.

It is understood that, there is a temperature range in which (2) both the refractive indices ($n_{Yclad}$ and $n_{oclad}$) sensed by the TE polarized light in the claddings 2a and 2b are lower than the refractive index $n_{core}$ of the core 1 and (2) one of the refractive indices ($n_{eclad}$) of the claddings 2a and 2b sensed by the TM polarized light is higher than the refractive index $n_{core}$ of the core 1 on a high temperature side in the drawing.

Figure 30:
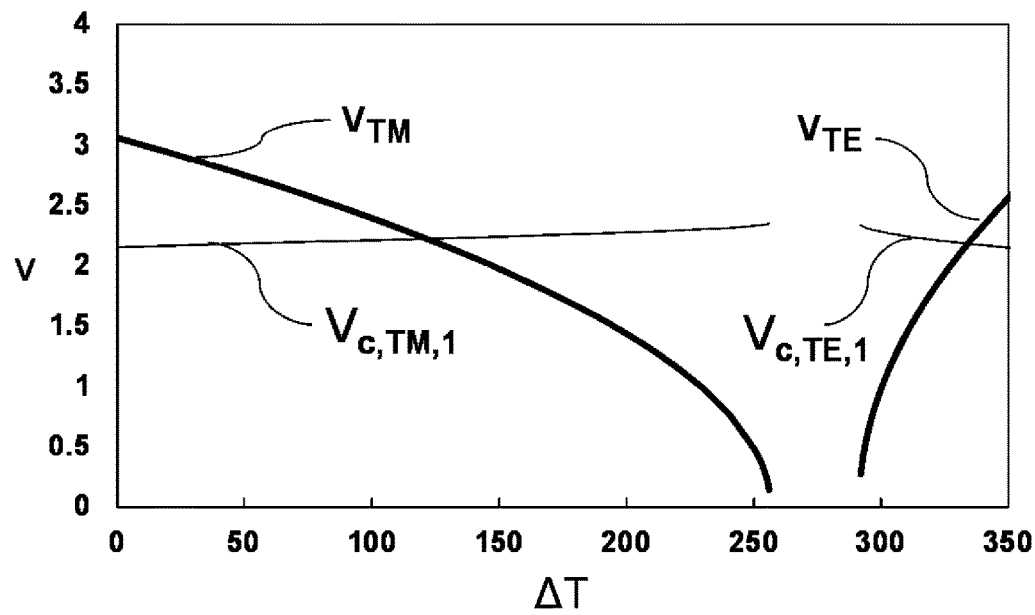
FIG. 30 is a view illustrating temperature dependence of a normalized frequency in the tenth embodiment of the present invention.

FIG. 30 is a view illustrating temperature dependence of a normalized frequency in the tenth embodiment of the present invention. The drawing is an example of a case in which thickness t of the core 1 is 20 μm.

In the drawing, $v_{TM}$ represents the normalized frequency specified for the TM polarized light, $v_{TE}$ represents the normalized frequency specified for the TE polarized light, $V_{c,TM,1}$ represents a cutoff frequency of a first-order guided mode for the TM polarized light, and $V_{c,TE,1}$ represents the cutoff frequency of the first-order guided mode for the TE polarized light. Other than this, the drawing is similar to that of the above-described embodiments.

In this embodiment, the claddings 2a and 2b have the different birefringence characteristics. The cutoff frequency of a case of such asymmetric planar waveguide is specified in the following manner.

$$v_{c,TE,m} = \frac{m\pi}{2} + \frac{1}{2}\tan^{-1}\sqrt{\gamma} \quad (3)$$

$$v_{c,TM,m} = \frac{m\pi}{2} + \frac{1}{2}\tan^{-1}\left(\frac{n_1^2}{n_0^2}\sqrt{\gamma}\right)$$

$$\gamma = \frac{n_s^2 - n_0^2}{n_1^2 - n_s^2} \quad n_s > n_0$$

Herein, $n_1$ represents the refractive index of the core 1, $n_0$ represents the refractive index of any one of the claddings 2a and 2b having a lower refractive index, $n_s$ represents the refractive index of any one of the claddings 2a and 2b having a higher refractive index, and γ represents a scale indicating an asymmetric property of the refractive indices.

From FIG. 30, it is understood that there is a temperature range in which the normalized frequency $v_{TM}$ for the TM polarized light decreases across the normalized frequency $v_{c,TM,1}$ for the first-order guided mode of the TM polarized light along with an increase in temperature from normal temperature.

This means that the optical waveguide 200 heated by a temperature control unit 400 and a temperature controlling element 300 (1) equivalently becomes the optical waveguide for the first or lower-order guided mode for the TM polarized light in a first temperature change range (ΔT≤120) and (2) equivalently becomes the optical waveguide for a zeroth-order guided mode for the TM polarized light in a second temperature change range (120≤ΔT≤256).

On the other hand, from FIG. 30, it is understood that there is a temperature range in which the normalized frequency $v_{TE}$ for the TE polarized light decreases across the normalized frequency $v_{c,TE,1}$ for the first-order guided mode for the TE polarized light along with a decrease in temperature from the high temperature side of the drawing.

This means that this (1) equivalently becomes the optical waveguide for the zeroth-order guided mode for the TE polarized light in a third temperature range (291≤ΔT≤333) and (2) equivalently becomes the optical waveguide for the first or lower-order guided mode for the TE polarized light in a fourth temperature range (333≤ΔT).

As described above, the optical device 500 of this embodiment has the effect similar to that of the above-described first embodiment in at least one of (1) the above-described first and second temperature ranges and (2) the third and fourth temperature ranges.

This means that the optical waveguide 200 of which temperature is controlled by the temperature control unit 400 and the temperature controlling element 300 may form (1) the optical waveguide capable of propagating only the TM mode as the guided mode in a certain temperature range (ΔT≤256 degrees C.) and (2) the optical waveguide capable of propagating only the TE mode as the guided mode in a temperature range (291 degrees C.≤ΔT) different from the above-described certain temperature range (ΔT≤256 degrees C.).

Therefore, according to the optical device 500 of this embodiment, (1) the optical waveguide 200 is prepared such that the refractive indices of the claddings 2a and 2b ($n_{Xcore}$ and $n_{ecore}$) sensed by the TM polarized light are lower than the refractive index $n_{core}$ of the core 1 and one of the refractive indices ($n_{Yclad}$ and $n_{oclad}$) of the claddings 2a and 2b sensed by the TE polarized light are higher than the refractive index $n_{core}$ of the core 1 and (2) when the optical device 500 is used, the temperature control unit 400 controls the temperature controlling element 300 such that the refractive indices ($n_{Ycore}$ and $n_{ocore}$) of the claddings 2a and 2b sensed by the TE polarized light are lower than the refractive index $n_{core}$ of the core 1 and one of the refractive indices ($n_{Xclad}$ and $n_{eclad}$) of the claddings 2a and 2b sensed by the TM polarized light is higher than the refractive index $n_{core}$ of the core 1. According to this, the TM mode and the TE mode may be switched as the guided modes of the light propagating through the optical waveguide 200 when the optical device 500 operates.

Although it is described by using the combination of the glass material having the refractive index of 1.538 at the wavelength of 1.535 μm, and CBO and crystal as the optical material of the core 1 and the optical materials of the claddings 2a and 2b in this embodiment, the combination is not limited to this.

It is possible to switch between the TM mode and the TE mode as the guided mode when the combination of the optical materials of the core 1 and the cladding 2 satisfies a condition that (1) one of the claddings 2a and 2b is such that (1a) a first refractive index sensed by light polarized in a first polarization direction and a second refractive index sensed by light polarized in a second polarization direction are lower than the refractive index of the core 1 and (1b) the first refractive index is higher than the refractive index $n_{core}$ of the core 1 and the second refractive index is lower than the refractive index $n_{core}$ of the core 1 in a temperature range different from the certain temperature range, and (2) the other of the claddings 2a and 2b is such that (2a) a third refractive index for the light polarized in the first polarization direction is lower than the first refractive index $n_{core}$ and a fourth refractive index for the light polarized in the second polarization direction is higher than the refractive index $n_{core}$ of the core 1 in the certain temperature range and (2b) the third and fourth refractive indices are lower than the refractive index $n_{core}$ of the core 1 in the different temperature range.

When the optical materials having the birefringence characteristics having a tendency described in this embodiment are used, it is possible to switch between the TM mode and the TE mode as the guided mode when the combination of the optical materials satisfies a condition that (1) regarding a birefringent material applied to one cladding (2b in the description above), the refractive index ($n_{eclad}$ in the description above) sensed by the light in the first polarization direction (TM in the description above) is lower than the refractive index $n_{core}$ of the core 1 only in the certain temperature range (0 to 256 degrees C. in the description above) and the refractive index ($n_{oclad}$ in the description above) sensed by the light in the second polarization direction (TE in the description above) is lower than the refractive index $n_{core}$ of the core 1 in an entire temperature control range (0 to 350 degrees C. in the description above) and (2) regarding the birefringent material applied to the other cladding (2a in the description above), the refractive index ($n_{Xclad}$ in the description above) in the first polarization direction (TM in the description above) is lower than the refractive index $n_{core}$ of the core 1 in the entire temperature control range (0 to 350 degrees C. in the description above) and the refractive index ($n_{Yclad}$ in the description above) in the second polarization direction (TE in the description above) is lower than the refractive index $n_{core}$ of the core 1 only in the temperature range different from the certain temperature range.

Although the temperature characteristic of the refractive index of each optical material substantially linearly changes with respect to the change in temperature in the temperature range in which the refractive index of the core 1 is higher than the refractive index of the claddings 2a and 2b in the above-described embodiments, the optical material in which this monotonically increases or decreases is sufficient and the characteristic is not limited to that illustrated. In this regard, substantially linear change with respect to the temperature is desirable. In this case, the configuration of the temperature controller 600 may be simplified and the temperature control becomes easier.

Various mounting modes are available in the mounting of the optical device 500 and, for example, (1) a case in which a certain component illustrated in the drawing is included in a certain component not illustrated, (2) a case of relationship opposite to that of (1) described above, and (3) a case in which a function of the component illustrated in the drawing partially overlaps with the function of the component not illustrated.

As the signal and information in the above-described embodiments, various mounting modes may be used in the mounting of the optical device 500 and, for example, (1) signal and information themselves, (2) values of the signal and information, (3) information indicating the values of the signal and information, and (4) parameters indicating the values of the signal and information may be applied.

The signal and information might have different attributes according to a way of mounting the optical device 500; in this case, the attribute of whether this is explicitly mounted or implicitly mounted or whether this is explicitly specified might be different. The signal or information other than those described in the above-described embodiment may also be included.

Each element in the drawing is conveniently divided for describing the present invention and the mounting mode thereof is not limited to the configuration, division, a name and the like of the drawing. The way of dividing is not limited to that illustrated.

A block in the drawing and in the following description can be replaced with another designation. For example, " . . . unit" can also be replaced with " . . . means", " . . . functional unit", " . . . circuit", " . . . element ( . . . device)", or " . . . device".

The temperature controller 600 in the optical device 500 of the embodiments and the control operation thereof may be variously modified in the problem and effect of the present invention; for example, (1) this is modified to substantially equivalent (or corresponding) means (or operation) to be mounted or (2) divided into a plurality of substantially equivalent means to be mounted.

Various options and variations in the above-described embodiments may be applied to another embodiment with respect to the problem and effects of the present invention to thereby realize a new embodiment.

REFERENCE SIGNS LIST

1: Core; 2a, 2b: Clad; 3, 4 and 5: Examples of Guided Mode; 100: Excitation Light Source; 200 Optical Waveguide; 300: Temperature Controlling Element; 400: Temperature Control Unit; 500: Optical Device; and 600: Temperature Controller.

The invention claimed is:

1. An optical device comprising: an optical waveguide including a core and a cladding which are optically joined together; and a temperature controller to control temperature of the optical waveguide,
    the optical waveguide including the core and the cladding formed such that a normalized frequency changes across a cutoff frequency of a guided mode due to change in temperature of the optical waveguide within a first temperature range, the normalized frequency being specified for light propagating through the optical waveguide, the cutoff frequency being determined from a structure of the optical waveguide and the normalized frequency, the first temperature range being a range where a refractive index of the core is higher than a refractive index of the cladding, and
    the temperature controller controlling the temperature of the optical waveguide over a second temperature range across a temperature at which the normalized frequency equals to the cutoff frequency, wherein
    the temperature controller is configured to vary the normalized frequency to be lower than the cutoff frequency by heating or cooling the optical waveguide.

2. The optical device according to claim 1, wherein the refractive indices of the core and the cladding have a relationship to decrease a difference between a square of the refractive index of the core and a square of the refractive index of the cladding with an increase or a decrease in the temperature of the optical waveguide to thereby change the normalized frequency of the optical waveguide across the cutoff frequency, in the first temperature range.

3. The optical device according to claim 1, wherein the core is formed of an optical material having a function that reduces attenuation of light, or a light amplifying function for the light propagating through the optical waveguide.

4. The optical device according to claim 1, wherein at least one of the core and the cladding is formed of an optical material of glass.

5. The optical device according to claim 1, wherein the cladding is formed of an optical material having a birefringence characteristic.

6. The optical device according to claim 1, wherein:
    the core has a plate shape; and
    the cladding is optically joined to the core on at least one principal surface of the core.

7. The optical device according to claim 3, further comprising an excitation unit to provide the light amplifying function to the core, wherein
    the core is provided with the light amplifying function for the light propagating through the optical waveguide by the excitation unit, and
    the optical waveguide amplifies laser light propagating through the optical waveguide in the core excited by the excitation unit.

8. The optical device according to claim 1, wherein the core is formed of glass selected from a group consisting of Er:Yb:Glass, Nd:Glass, Er:Glass, Yb:Glass, Pr:Glass, Nd:YLF, Yb:YLF, Er:YLF, Pr:YLF, Ho:YLF, Tm:YLF, Tm:Ho:YLF, Yb:KYW, Yb:KGW, Cr:LiSAF, Yb:YAG, Nd:YAG, Er:YAG, Er:Yb:YAG, Cr:Tm:Ho:YAG, Tm:Ho:YAG, Tm:YAG, Ho:YAG, and Pr:YAG.

9. The optical device according to claim 8, wherein the selected glass is phosphate glass, quartz glass, or fluoride glass.

10. The optical device according to claim 7, wherein:
the core is formed of Er:Glass; and
the cladding is formed of an optical material of glass having a refractive index characteristic that allows a difference between a square of the refractive index of the cladding and a square of the refractive index of the core to be changed with a change in the temperature of the optical waveguide to thereby change the normalized frequency of the optical waveguide across the cutoff frequency, in the first temperature range.

11. The optical device according to claim 7, wherein:
the core is formed of Er/Yb co-doped phosphate glass; and
the cladding is formed of an optical material of glass having a refractive index characteristic that allows a difference between a square of the refractive index of the cladding and a square of the refractive index of the core to be changed with a change in the temperature of the optical waveguide to thereby change the normalized frequency of the optical waveguide across the cutoff frequency, in the first temperature range.

12. The optical device according to claim 7, wherein:
the core is formed of Nd: Glass; and
the cladding is formed of an optical material of glass having a refractive index characteristic that allows a difference between a square of the refractive index of the cladding and a square of the refractive index of the core to be changed with a change in the temperature of the optical waveguide to thereby change the normalized frequency of the optical waveguide across the cutoff frequency, in the first temperature range.

13. The optical device according to claim 7, wherein:
the core is formed of Nd doped quartz glass; and
the cladding is formed of an optical material of glass having a refractive index characteristic that allows a difference between a square of the refractive index of the cladding and a square of the refractive index of the core to be changed with a change in the temperature of the optical waveguide to thereby change the normalized frequency of the optical waveguide across the cutoff frequency, in the first temperature range.

14. The optical device according to claim 7, wherein:
the core is formed of Nd:YLF; and
the cladding is formed of an optical material of glass having a refractive index characteristic that allows a difference between a square of the refractive index of the cladding and a square of the refractive index of the core to be changed with a change in the temperature of the optical waveguide to thereby change the normalized frequency of the optical waveguide across the cutoff frequency, in the first temperature range.

15. The optical device according to claim 7, wherein:
the core is formed of Yb:YAG; and
the cladding is formed of an optical material of glass having a refractive index characteristic that allows a difference between a square of the refractive index of the cladding and a square of the refractive index of the core to be changed with a change in the temperature of the optical waveguide to thereby change the normalized frequency of the optical waveguide across the cutoff frequency, in the first temperature range.

16. The optical device according to claim 7, wherein: the core is formed of Er:Glass; and the cladding is formed of calcite.

17. The optical device according to claim 7, wherein: the core is formed of Er/Yb co-doped phosphate glass; and the cladding is formed of calcite.

18. The optical device according to claim 7, wherein: the core is formed of Nd:Glass; and the cladding is formed of BBO.

19. The optical device according to claim 5, wherein:
the cladding, in the first temperature range, exhibits a refractive index being lower than the refractive index of the core which is a first refractive index of the cladding specified for light polarized in a first polarization direction perpendicular to an optical axis of the light propagating through the optical waveguide, and exhibits another refractive index being higher than the refractive index of the core which is a second refractive index of the cladding specified for light polarized in a second polarization direction perpendicular to the optical axis and the first polarization direction; and
the normalized frequency is specified for the light polarized in the first polarization direction which propagates through the optical waveguide.

20. The optical device according to claim 5, wherein the cladding includes a first cladding portion and a second cladding portion which have different birefringence characteristics,
the first cladding portion exhibiting refractive indices being lower than the refractive index of the core in the first temperature range which are a first refractive index specified for light polarized in a first polarization direction perpendicular to an optical axis of the light propagating through the optical waveguide and a second refractive index specified for light polarized in a second polarization direction perpendicular to the optical axis and the first polarization direction, and, in a third temperature range different from the first temperature range, exhibiting the first refractive index being higher than the refractive index of the core, and the second refractive index being lower than the refractive index,
the second cladding portion, in the first temperature range, exhibiting a refractive index being lower than the refractive index of the core which is a third refractive index specified for the light polarized in the first polarization direction, and a refractive index being higher than the refractive index of the core which is a fourth refractive index specified for the light polarized in the second polarization direction, and, in the third temperature range, exhibiting the third and fourth refractive indices being lower than the refractive index of the core,
the normalized frequency being specified for at least one of the light polarized in the first polarization direction propagating through the optical waveguide and the light polarized in the second polarization direction propagating through the optical waveguide, and
the second temperature range including the third temperature range.

* * * * *